US007175558B2

(12) United States Patent
Puiu et al.

(10) Patent No.: US 7,175,558 B2
(45) Date of Patent: Feb. 13, 2007

(54) TORQUE VECTORING DRIVE UNITS WITH WORM DRIVEN BALL SCREW CLUTCHES

(75) Inventors: Dumitru Puiu, Sterling Heights, MI (US); Thomas C. Bowen, Rochester Hills, MI (US)

(73) Assignee: Magna Powertrain USA, Inc., Troy, MI (US)

(*) Notice: Subject to any disclaimer, the term of this patent is extended or adjusted under 35 U.S.C. 154(b) by 165 days.

(21) Appl. No.: 11/037,777

(22) Filed: Jan. 18, 2005

(65) Prior Publication Data

US 2005/0159264 A1 Jul. 21, 2005

Related U.S. Application Data

(63) Continuation-in-part of application No. 10/383,404, filed on Mar. 7, 2003, now Pat. No. 6,851,537.

(51) Int. Cl.
*F16H 48/06* (2006.01)

(52) U.S. Cl. ...................................................... 475/225

(58) Field of Classification Search ................ 475/221, 475/225

See application file for complete search history.

(56) References Cited

U.S. PATENT DOCUMENTS

| | | | |
|---|---|---|---|
| 672,620 | A | 6/1901 | Buffum |
| 856,703 | A | 6/1907 | Iversen |
| 1,382,289 | A | 6/1921 | Janicki |
| 1,954,686 | A | 4/1934 | Stickney |
| 1,964,956 | A | 7/1934 | Lincoln |
| 2,466,683 | A | 4/1949 | Buckendale |
| 3,178,958 | A | 4/1965 | Beck |
| 3,690,426 | A | 9/1972 | Weisgerber |
| 4,449,416 | A | 5/1984 | Huitema |
| 4,648,498 | A | 3/1987 | Herbulot et al. |
| 4,691,593 | A | 9/1987 | Mueller |
| 4,757,728 | A | 7/1988 | Pitsch |
| 4,763,747 | A | 8/1988 | Muller |
| 4,805,486 | A | 2/1989 | Hagiwara et al. |
| 4,895,236 | A | 1/1990 | Sakakibara et al. |
| 4,976,347 | A | 12/1990 | Sakakibara et al. |
| 5,007,886 | A | 4/1991 | Holmquist et al. |
| 5,199,325 | A | 4/1993 | Reuter et al. |

(Continued)

FOREIGN PATENT DOCUMENTS

DE 3908478 A1 5/1989

(Continued)

*Primary Examiner*—Dirk Wright
(74) *Attorney, Agent, or Firm*—Harness, Dickey & Pierce, P.L.C.

(57) ABSTRACT

A torque transfer mechanism for controlling the magnitude of a clutch engagement force exerted on a clutch pack that is operably disposed between a first rotary member and a second rotary member includes an actuator having an inner sleeve, an outer sleeve, and a plurality of balls. The inner sleeve is supported for rotation relative to the first rotary member and each of the inner and outer sleeves includes a spiral groove aligned with the other. The balls are positioned within the spiral grooves between the inner and outer sleeves. An electric motor selectively rotates one of the inner and outer sleeves so as to induce axial movement of the other of the inner and outer sleeves to engage the clutch.

12 Claims, 14 Drawing Sheets

U.S. PATENT DOCUMENTS

| | | | | |
|---|---|---|---|---|
| 5,267,635 | A | 12/1993 | Peterson et al. | |
| 5,323,871 | A | 6/1994 | Wilson et al. | |
| 5,370,588 | A | 12/1994 | Sawase et al. | |
| 5,407,024 | A | 4/1995 | Watson et al. | |
| 5,415,598 | A | 5/1995 | Sawase et al. | |
| 5,423,235 | A | 6/1995 | Botterill et al. | |
| 5,456,641 | A | 10/1995 | Sawase | |
| 5,562,192 | A | 10/1996 | Dick | |
| 5,632,185 | A | 5/1997 | Gassmann | |
| 5,699,888 | A | 12/1997 | Showalter | |
| 5,904,634 | A | 5/1999 | Teraoka | |
| 5,910,064 | A | 6/1999 | Kuroki | |
| 5,911,291 | A | 6/1999 | Suetake et al. | |
| 6,120,407 | A | 9/2000 | Mimura | |
| 6,213,241 | B1 | 4/2001 | Kita et al. | |
| 6,378,677 | B1 | 4/2002 | Kuroda et al. | |
| 6,394,246 | B1 | 5/2002 | Gassmann et al. | |
| 6,398,686 | B1 | 6/2002 | Irwin | |
| 6,520,880 | B1 | 2/2003 | Fukushima et al. | |
| 6,533,090 | B2 | 3/2003 | Osborn et al. | |
| 6,616,566 | B2 | 9/2003 | Gorlich | |
| 6,645,108 | B1 | 11/2003 | Gradu | |
| 6,698,565 | B2 | 3/2004 | Cool et al. | |
| 6,808,053 | B2 | 10/2004 | Kirkwood et al. | |
| 6,851,537 | B2 | 2/2005 | Bowen | |
| 6,951,522 | B2 * | 10/2005 | Baxter et al. | 475/205 |
| 7,004,876 | B2 * | 2/2006 | Puiu | 475/205 |
| 7,059,991 | B2 * | 6/2006 | Puiu | 475/201 |

FOREIGN PATENT DOCUMENTS

| | | |
|---|---|---|
| JP | 62-18117 | 1/1987 |
| JP | 3-66927 | 3/1991 |
| WO | WO 02/09966 A1 | 2/2002 |

* cited by examiner

TORQUE VECTORING DRIVE UNITS WITH WORM DRIVEN BALL SCREW CLUTCHES

CROSS-REFERENCE TO RELATED APPLICATIONS

This application is a continuation-in-part of U.S. Ser. No. 10/383,404 filed Mar. 7, 2003, now U.S. Pat. No. 6,851,537, the entire disclosure of which is incorporated by reference hereon.

FIELD OF THE INVENTION

The present invention relates generally to power transfer systems for use in motor vehicles and, more specifically, to a torque distributing mechanism and an active clutch control system.

BACKGROUND OF THE INVENTION

In view of consumer demand for four-wheel drive vehicles, many different power transfer system are currently utilized for directing motive power ("drive torque") to all four-wheels of the vehicle. A number of current generation four-wheel drive vehicles may be characterized as including an "adaptive" power transfer system that is operable for automatically directing power to the secondary driveline, without any input from the vehicle operator, when traction is lost at the primary driveline. Typically, such adaptive torque control results from variable engagement of an electrically or hydraulically operated transfer clutch based on the operating conditions and specific vehicle dynamics detected by sensors associated with an electronic traction control system. In conventional rear-wheel drive (RWD) vehicles, the transfer clutch is typically installed in a transfer case for automatically transferring drive torque to the front driveline in response to slip in the rear driveline. Similarly, the transfer clutch can be installed in a power transfer device, such as a power take-off unit (PTU) or in-line torque coupling, when used in a front-wheel drive (FWD) vehicle for transferring drive torque to the rear driveline in response to slip in the front driveline. Such adaptively-controlled power transfer system can also be arranged to limit slip and bias the torque distribution between the front and rear drivelines by controlling variable engagement of a transfer clutch that is operably associated with a center differential installed in the transfer case or PTU.

Currently, a large number of adaptive power transfer systems are equipped with an electrically-controlled clutch actuator that can regulate the amount of drive torque transferred as a function of the value of an electrical control signal applied thereto. In some applications, the transfer clutch employs an electromagnetic clutch as the power-operated actuator. For example, U.S. Pat. No. 5,407,024 discloses an electromagnetic coil that is incrementally activated to control movement of a ball-ramp operator for applying a clutch engagement force on a multi-plate clutch assembly. Likewise, Japanese Laid-open Patent Application No. 62-18117 discloses a transfer clutch equipped with an electromagnetic actuator for directly controlling actuation of the multi-plate clutch pack assembly. As an alternative, U.S. Pat. No. 5,323,871 a transfer clutch equipped with an electric motor that controls rotation of a sector plate which, in turn, controls pivotal movement of a lever arm that is operable for applying a variable clutch engagement force on a multi-plate clutch assembly. Moreover, Japanese Laid-open Patent Application No. 63-66927 discloses a transfer clutch which uses an electric motor to rotate one cam plate of a ball-ramp operator for engaging a multi-plate clutch assembly. Finally, U.S. Pat. No. 4,895,236 discloses a transfer clutch having an electric motor driving a reduction gearset for controlling movement of a ball screw operator which, in turn, applies the clutch engagement force to the clutch pack.

To further enhance the traction and stability characteristics of four-wheel drive vehicles, it is also known to equip such vehicles with brake-based electronic stability control systems and/or traction distributing axle assemblies. Typically, such axle assemblies include a drive mechanism that is operable for adaptively regulating the side-to-side (i.e., left-right) torque and speed characteristics between a pair of drive wheels. In some instances, a pair of modulatable clutches is used to provide this side-to-side control, as is disclosed in U.S. Pat. No. 6,378,677 and 5,699,888. According to an alternative drive axle arrangement, U.S. Pat. No. 6,520,880 discloses a hydraulically-operated traction distribution assembly. In addition, alternative traction distributing drive axle assemblies are disclosed in U.S. Pat. Nos. 5,370,588 and 6,213,241.

As part of the ever increasing sophistication of adaptive power transfer systems, greater attention is currently being given to the yaw control and stability enhancement features that can be provided by such traction distributing drive axles. Accordingly, this invention is intended to address the need to provide design alternatives which improve upon the current technology.

SUMMARY OF THE INVENTION

Thus, it is a general object of the present invention to provide a transfer clutch having an electrically-operated clutch actuator that is operable for engaging a multi-plate clutch assembly.

As a related object, the transfer clutch of the present invention is well-suited for use in motor vehicle driveline applications to control the transfer of drive torque between an input member and an output member.

The transfer clutch of the present invention includes a worm driven actuator which controls operation of a ball screw operator for controlling the magnitude of clutch engagement force exerted on a multi-plate clutch assembly that is operably disposed between an input member and an output member. The worm driven actuator includes a cylindrical shaft having a helicoid tooth worm which receives torque from an input source enabling said worm to engage and drive a toothed gear and rotor. The ball screw operator includes a threaded screw mounted on the output member and which is splined to a second segment of the rotor, a threaded nut, a plurality of balls retained between the aligned threads of the screw and nut, and a drag spring providing a predetermined drag force between the screw and the output member. The multi-plate clutch assembly includes a drum driven by the input member, a hub driving the output member, and a clutch pack operably disposed between the drum and hub. The clutch assembly includes a pressure plate adapted to act on one end of the clutch pack. In operation, engagement of the worm driven gear causes relative rotation between the screw and nut of the ball screw operator. As such, relative rotation in a first direction causes axial movement of the threaded nut in a first direction which, in turn, causes the pressure plate to exert a clutch engagement force on the clutch pack. Likewise, relative rotation between the screw and nut in the opposite direction causes axial movement of the nut in a second direction which, in turn, causes the pressure plate to disengage the clutch pack.

Accordingly, it is a further objective of the present invention to provide a drive axle assembly for use in motor vehicles which are equipped with one or more transfer clutches and an adaptive yaw control system.

To achieve this particular objective, the drive axle assembly of the present invention includes first and second axleshafts connected to a pair of wheels and a drive mechanism that is operable to selectively couple a driven input shaft to one or both of the axleshafts. The drive mechanism includes a differential assembly, a planetary gear assembly, and first and second transfer clutches. The planetary gear assembly is operably disposed between the differential assembly and the first axleshafts. The first transfer clutch is operable in association with the planetary gear assembly to increase the rotary speed of the first axleshaft which, in turn, causes the differential assembly to decrease the rotary speed of the second axleshaft. In contrast, the second transfer clutch is operable in association with the planetary gear assembly to decrease the rotary speed of the first axleshaft so as to cause the differential assembly to increase the rotary speed of the second axleshaft. Accordingly, selective control over actuation of one or both of the first and second transfer clutches provides adaptive control of the speed differentiation and the torque transferred between the first and second axleshafts. A control system including and ECU and sensors are provided to control actuation of both transfer clutches.

To achieve a similar objective, the drive axle assembly of the present invention includes first and second axleshafts connected to a pair of wheels and a torque distributing drive mechanism that is operable for transferring drive torque from a driven input shaft to the first and second axleshafts. The torque distributing drive mechanism includes a differential, first and second speed changing units, and first and second transfer clutches. The differential includes an input component driven by the input shaft, a first output component driving the first axleshaft and a second output component driving the second axleshaft. The first speed changing unit includes a first planetary gearset having a first sun gear driven by the first output component, a first ring gear, and a set of first planet gears rotatably supported by the input component and which are meshed with the first ring gear and the first sun gear. The second speed changing unit includes a second planetary gearset having a second sun gear driven by the second output component, a second ring gear, and a set of second planet gears rotatably supported by the input component and which are meshed with the second ring gear and the second sun gear. The first transfer clutch is operable for selectively braking rotation of the first ring gear. Likewise, the second transfer clutch is operable for selectively braking rotation of the second ring gear. Accordingly, selective control over actuation of the first and second transfer clutches provides adaptive control of the speed differentiation and the torque transferred between the first and second axleshafts. A control system including and ECU and sensors are provided to control actuation of both transfer clutches.

In accordance with another embodiment of a drive axle assembly according to the present invention, the torque distributing drive mechanism includes a differential, first and second speed changing units, and first and second transfer clutches. The differential includes an input component driven by the input shaft and first and second output components. The first speed changing unit is a first planetary gearset having a first sun gear driving the first axleshaft, a first ring gear driven by the first output component, and a set of first planet gears rotatably supported by the input component and which are meshed with the first sun gear and the first ring gear. The second speed changing unit is a second planetary gearset having a second sun gear driving the second axleshaft, a second ring gear driven by the second output component, and a set of second planet gears rotatably supported by the input component and which are meshed with the second sun gear and the second ring gear. The first transfer clutch is again operable for selectively braking rotation of the first ring gear while the second transfer clutch is operable for selectively braking rotation of the second ring gear. The control system controls actuation of the first and second transfer clutches for controlling the speed differentiation and torque transferred between the first and second axleshafts.

To achieve a related objective, a drive axle assembly according to the present invention includes first and second axleshafts connected to a pair of wheels and a torque distributing drive mechanism that is operable for transferring drive torque from a driven input shaft to the first and second axleshafts. The torque distributing drive mechanism includes a differential, first and second speed changing units, and first and second transfer clutches. The differential includes an input component driven by the input shaft, a first output component driving the first axleshaft and a second output component driving the second axleshaft. The first speed changing unit includes a first planetary gearset having a first planet carrier driven with the first output component, a first ring gear driven by the input component, a first sun gear, and a set of first planet gears rotatably supported by the first planet carrier and which are meshed with the first ring gear and the first sun gear. The second speed changing unit includes a second planetary gearset having a second planet carrier driven with the second output component, a second ring gear driven by the input component, a second sun gear, and a set of second planet gears rotatably supported by the second planet carrier and which are meshed with the second ring gear and the second sun gear. The first transfer clutch is operable for selectively braking rotation of the first sun gear. Likewise, the second transfer clutch is operable for selectively braking rotation of the second sun gear. Accordingly, selective control over actuation of the first and second transfer clutches provides adaptive control of the speed differentiation and the torque transferred between the first and second axleshafts.

Further objectives and advantages of the present invention will become apparent by reference to the following detailed description of the preferred embodiment and the appended claims when taken in conjunction with the accompanying drawings.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a transfer clutch that can be adaptively controlled for modulating the torque transferred from an input member to an output member. The transfer clutch finds particular application in motor vehicle drivelines as, for example, an on-demand clutch in a transfer case or in-line torque coupling, a biasing clutch associated with a differential assembly in a transfer case or a drive axle assembly, or as a shift clutch in power transmission assemblies. Thus, while the present invention is hereinafter described in association with a particular construction for use in a particular driveline application, it will be understood that the constructions/applications shown and described are merely intended to illustrate embodiments of the present invention.

Figure 1:
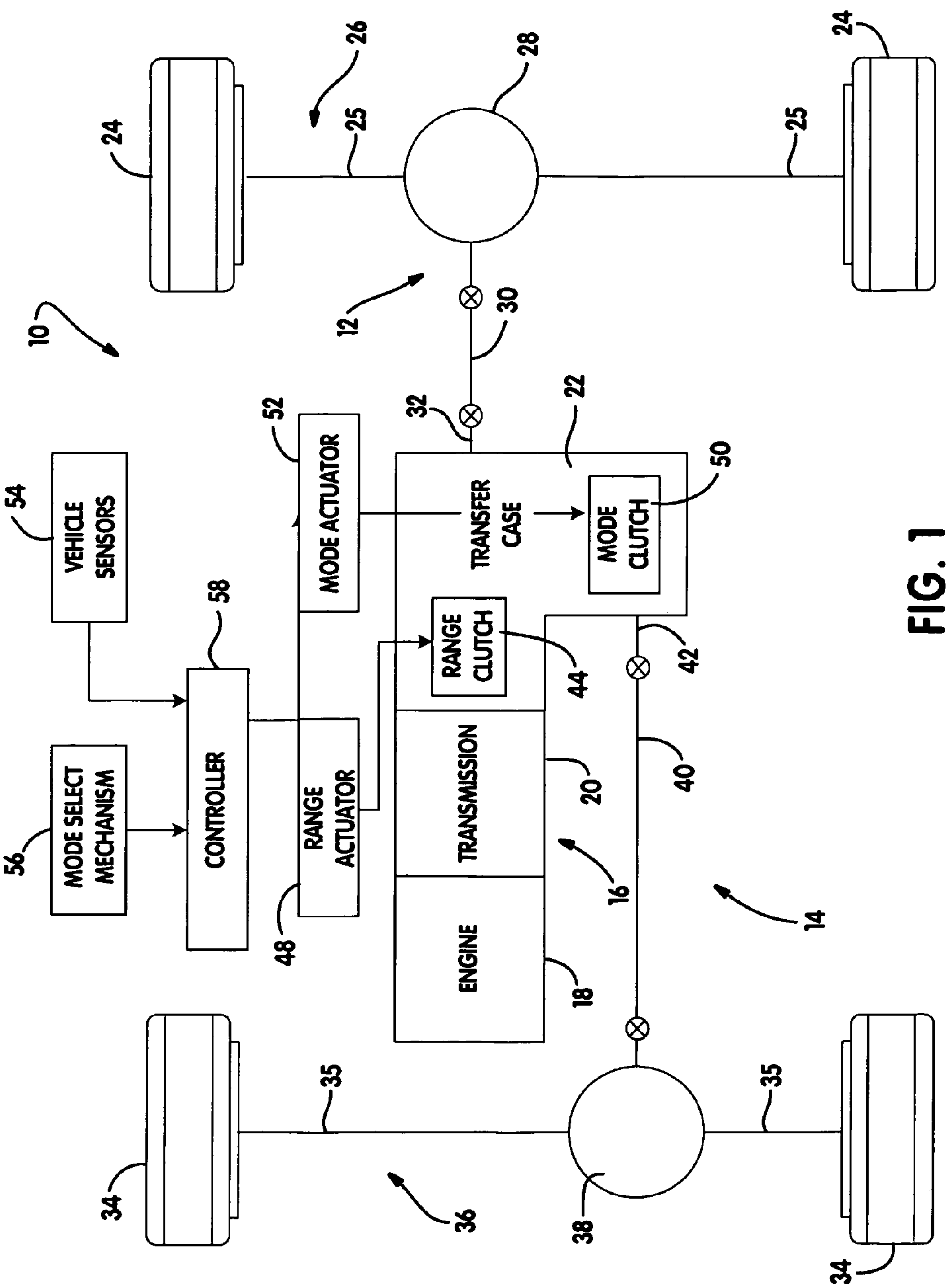
FIG. 1 illustrates the drivetrain of a four-wheel drive vehicle equipped with a transfer case incorporating the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a transfer case 22. Rear driveline 12 includes a pair of rear wheels 24 connected to a pair of rear axleshafts 25 associated with a rear axle assembly 26. Rear assembly 26 also includes a rear differential 28 that is coupled to one end of a rear propshaft 30, the opposite end of which is coupled to a rear output shaft 32 of transfer case 22. Front driveline 14 includes a front axle assembly 36 having a pair of front wheels 34 connected by a pair of front axleshafts 35 to a front differential 38. As seen, a front propshaft 40 couples front differential 38 to a front output shaft 42 of transfer case 22.

With continued reference to FIG. 1, drivetrain 10 is shown to further include an electronically-controlled power transfer system for permitting a vehicle operator to select between a two-wheel drive mode, a part-time four-wheel high-range drive mode, an on-demand four-wheel high-range drive mode, a neutral non-driven mode, and a part-time four-wheel low-range drive mode. In this regard, transfer case 22 is equipped with a range clutch 44 that is operable for establishing the high-range and low-range drive connections between an input shaft 46 and rear output shaft 32, and a power-operated range actuator 48 operable to actuate range clutch 44. Transfer case 22 also includes a mode or transfer clutch 50 that is operable for transferring drive torque from rear output shaft 32 to front output shaft 42 for establishing the part-time and on-demand four-wheel drive modes. The power transfer system further includes a power-operated mode actuator 52 for actuating transfer clutch 50, vehicle sensors 54 for detecting certain dynamic and operational characteristics of the motor vehicle, a mode select mechanism 56 for permitting the vehicle operator to select one of the available drive modes, and a controller 58 for controlling actuation of range actuator 48 and mode actuator 52 in response to input signals from vehicle sensors 54 and mode select mechanism 56.

Figure 2:
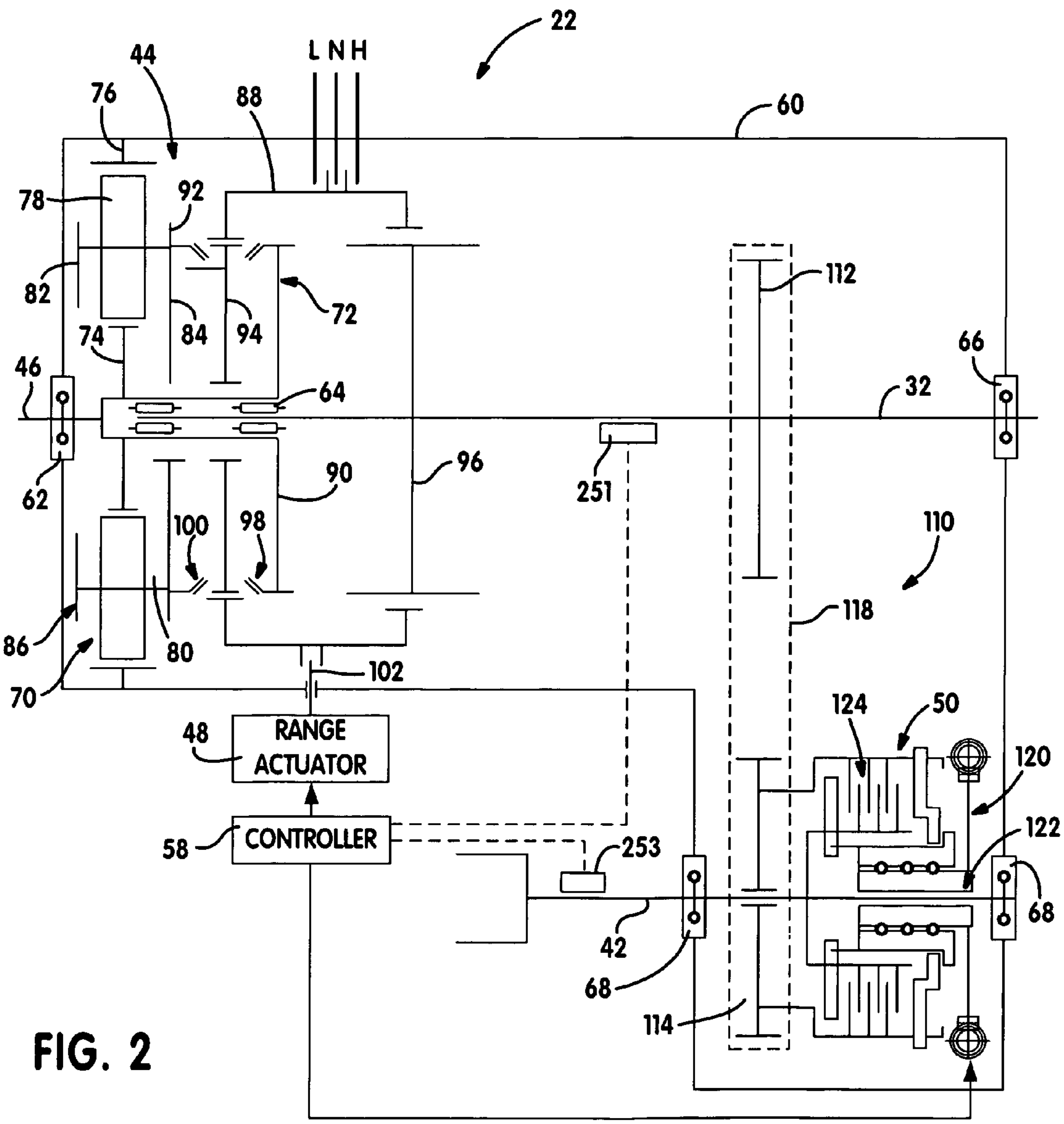
FIG. 2 is a schematic illustration of a transfer case equipped with the on-demand transfer clutch of the present invention.

Transfer case 22 is shown schematically in FIG. 2 to include a housing 60 from which input shaft 46 is rotatably supported by bearing assembly 62. Input shaft 46 is adapted for connection to the output shaft of transmission 20. Rear output shaft 32 is also shown rotatably supported between input shaft 46 and housing 60 via bearing assemblies 64 and 66 while front output shaft 42 is rotatably supported from housing 60 by a pair of laterally-spaced bearing assemblies 68. Range clutch 44 is shown to include a planetary gearset 70 and a synchronized range shift mechanism 72. Planetary gearset 70 includes a sun gear 74 fixed for rotation with input shaft 46, a ring gear 76 fixed to housing 60, and a set of planet gears 78 rotatably supported on pinion shafts 80 extending between front and rear carrier rings 82 and 84, respectively, that are interconnected to define a carrier 86. Planetary gearset 70 functions as a two-speed reduction unit which, in conjunction with a sliding range sleeve 88 of synchronized range shift mechanism 72, is operable to establish either of a first or second drive connection between input shaft 46 and rear output shaft 32. To establish the first drive connection, input shaft 46 is directly coupled to rear output shaft 32 for defining a high-range drive mode in which rear output shaft 32 is driven at a first (i.e., direct) speed ratio relative to input shaft 46. Likewise, the second drive connection is established by coupling carrier 86 to rear output shaft 32 for defining a low-range drive mode in which rear output shaft 32 is driven at a second (i.e., reduced) speed ratio relative to input shaft 46. A neutral non-driven mode is established when rear output shaft 32 is disconnected from both input shaft 46 and carrier 86.

Synchronized range shift mechanism 72 includes a first clutch plate 90 fixed for rotation with input shaft 46, a second clutch plate 92 fixed for rotation with rear carrier ring 84, a clutch hub 94 rotatably supported on input shaft 46 between clutch plates 90 and 92, and a drive plate 96 fixed for rotation with rear output shaft 32. Range sleeve 88 has a first set of internal spline teeth that are shown meshed with external spline teeth on clutch hub 94, and a second set of internal spline teeth that are shown meshed with external spline teeth on drive plate 96. As will be detailed, range sleeve 88 is axially moveable between three distinct positions to establish the high-range, low-range and neutral modes. Range shift mechanism 72 also includes a first synchronizer assembly 98 located between hub 94 and first clutch plate 90 and a second synchronizer assembly 100 is disposed between hub 94 and second clutch plate 92. Synchronizers 98 and 100 work in conjunction with range sleeve 88 to permit on-the-move range shifts.

With range sleeve 88 located in its neutral position, as denoted by position line "N", its first set of spline teeth are disengaged from the external clutch teeth on first clutch plate 90 and from the external clutch teeth on second clutch plate 92. First synchronizer assembly 98 is operable for causing speed synchronization between input shaft 46 and rear output shaft 32 in response to sliding movement of range sleeve 88 from its N position toward a high-range position, denoted by position line "H". Upon completion of speed synchronization, the first set of spline teeth on range sleeve 88 moves into meshed engagement with the external clutch teeth on first clutch plate 90 while its second set of spline teeth are maintained in engagement with the spline teeth on drive plate 96. Thus, movement of range sleeve 88 to its H position acts to couple rear output shaft 32 for common rotation with input shaft 46 and establishes the high-range drive connection therebetween. Similarly, second synchronizer assembly 100 is operable for causing speed synchronization between carrier 86 and rear output shaft 32 in response to sliding movement of range sleeve 88 from its N position to a low-range position, as denoted by position line "L". Upon completion of speed synchronization, the first set of spline teeth on range sleeve 88 moves into meshed engagement with the external clutch teeth on second clutch plate 92 while the second set of spline teeth on range sleeve 88 are maintained in engagement with the external spline teeth on drive plate 96. Thus with range sleeve 88 located in its L position, rear output shaft 32 is coupled for rotation with carrier 86 and establishes the low-range drive connection between input shaft 46 and rear output shaft 32.

To provide means for moving range sleeve 88 between its three distinct range positions, range shift mechanism 72 further includes a range fork 102 coupled to range sleeve 88 and which is mounted on a shift rail (not shown) for axial movement thereon. Range actuator 48 is operable to move range fork 102 on the shift rail for causing corresponding axial movement of range sleeve 88 between its three range positions. Range actuator 48 is preferably an electric motor arranged to move range sleeve 88 to a specific range position in response to a control signal from controller 58 that is based on the signal delivered to controller 58 from mode select mechanism 56.

It will be appreciated that the synchronized range shift mechanism permits "on-the-move" range shifts without the need to stop the vehicle which is considered to be a desirable feature. However, other synchronized and non-synchronized versions of range clutch 44 can be used in substitution for the particular arrangement shown. Also, it is contemplated that range clutch 44 can be removed entirely from transfer case 22 such that input shaft 46 would directly drive rear output shaft 32 to define a one-speed version of the on-demand transfer case embodying the present invention.

Figure 3:
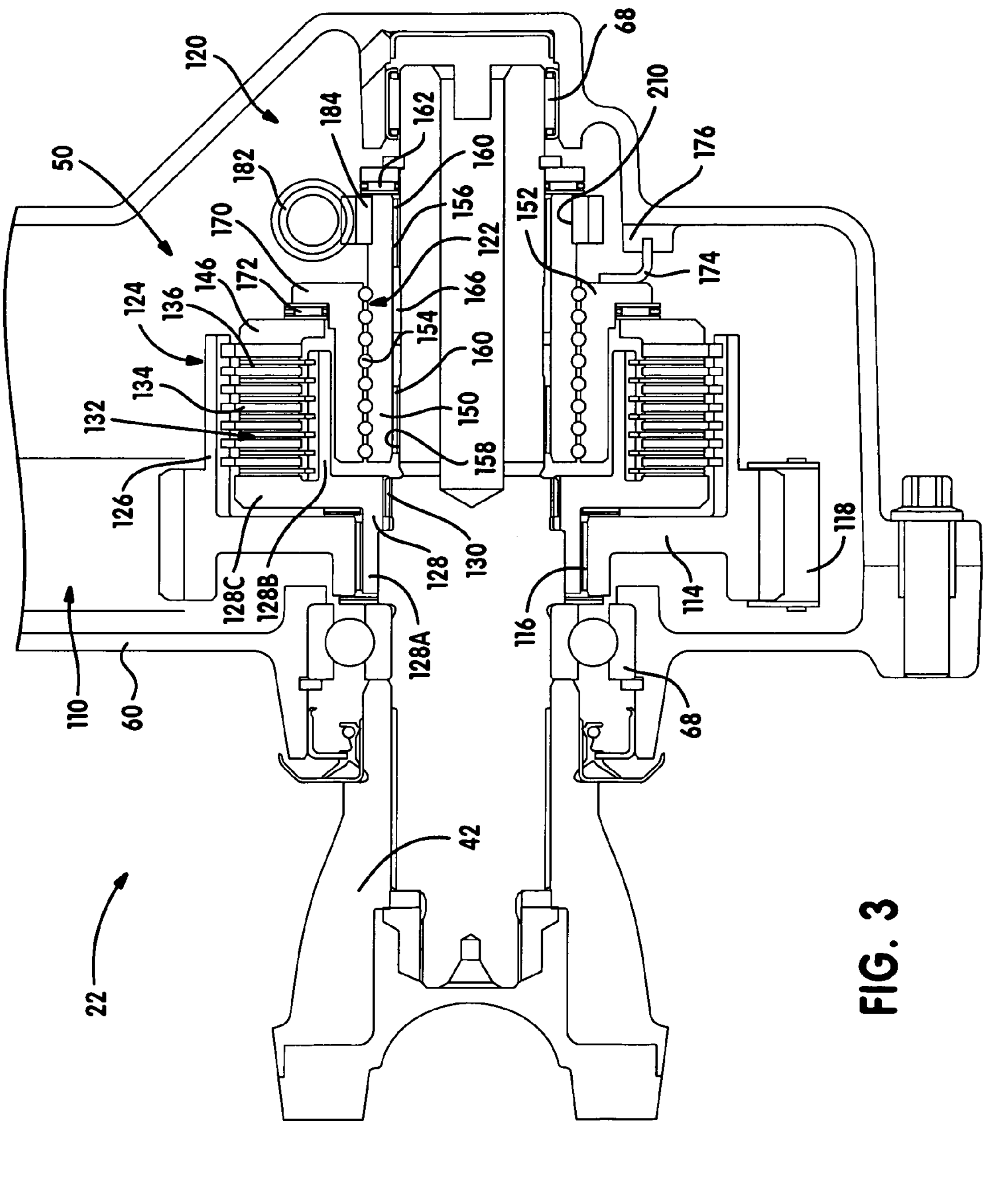
FIG. 3 is a partial sectional view of the transfer clutch arranged for selectively transferring drive torque from the rear output shaft to the front output shaft.
Figure 4:
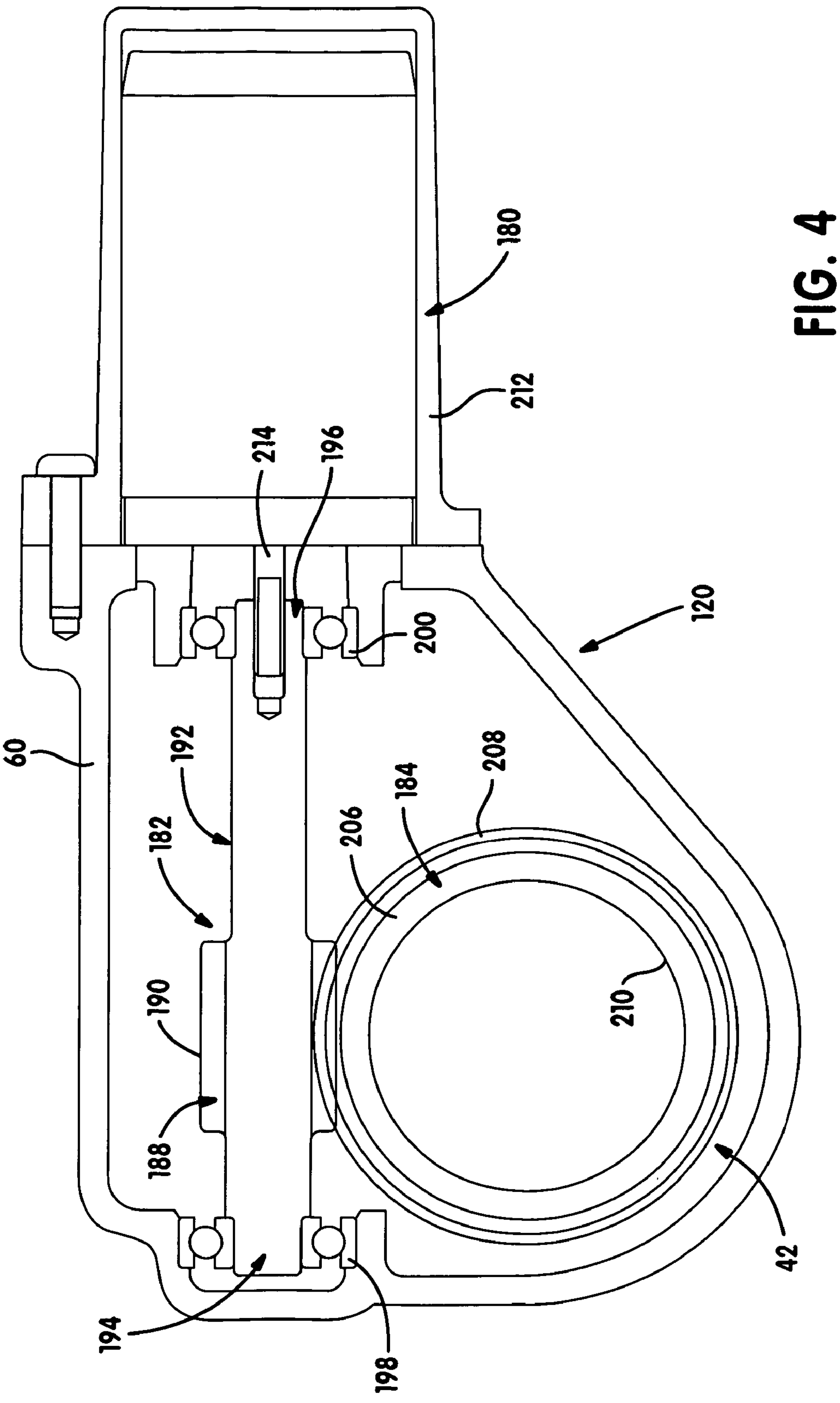
FIG. 4 is a partial sectional view of a worm gear mechanism of the present invention.

Referring now primarily to FIGS. 2–4 of the drawings, transfer clutch 50 is shown arranged in association with front output shaft 42 in such a way that it functions to deliver drive torque from a transfer assembly 110 driven by rear output shaft 32 to front output shaft 42 for establishing the four-wheel drive modes. Transfer assembly 110 includes a first sprocket 112 fixed for rotation with rear output shaft 32, a second sprocket 114 rotatably supported by bearings 116 on front output shaft 42, and a power chain 118 encircling sprockets 112 and 114. As will be detailed, mode actuator 52 includes a worm driven clutch actuator 120 while transfer clutch 50 includes a ball screw operator 122 and a multi-plate clutch assembly 124.

Clutch assembly 124 is shown to include an annular drum 126 integrally connected the with sprocket 114, a hub 128 fixed via a splined connection 130 for rotation with front output shaft 42, and a multi-plate clutch pack 132 operably disposed between drum 126 and hub 128. Hub 128 is shown to include a first smaller diameter hub segment 128A and a second larger diameter hub segment 128B that are interconnected by a radial plate segment 128C. Clutch pack 132 includes a set of outer friction plates 134 splined to drum 126 which are alternatively interleaved with a set of inner friction plates 136 splined to hub segment 128B of clutch hub 128. A pressure plate 146 is splined to the rim of drum 126 for rotation therewith.

With continued reference to FIGS. 3 and 4, ball screw operator 122 of transfer clutch 50 is shown to include an externally threaded screw 150, an internally threaded nut 152, and balls 154 disposed in aligned threads between screw 150 and nut 152. Screw 150 has an inner surface 156 that is rotatably supported on an outer surface 158 of front output shaft 42 by a pair of bearings 160. A thrust bearing assembly 162 is shown on screw 150 so as to facilitate rotation thereof relative to hub 128 and bearing assembly 68.

Nut 152 includes a radially-extending rim defining an apply plate 170 that is adapted to act on pressure plate 146. Apply plate 170 and pressure plate 146 are separated by a thrust bearing assembly 172 which permits relative rotation therebetween. A tab 174 is coupled to nut 152 and extends therefrom to engage a step 176 protruding from an inner surface of housing 60. Tab 174 prevents rotation of nut 152 to assure that rotation of screw 150 is converted to linear translation of nut 152.

Worm driven clutch actuator 120 includes an electric motor 180, a worm 182 and a gear 184. Worm 182 includes a body 188 having a single external tooth 190 formed thereon. Worm 182 also includes a shaft 192 having a first end 194 and a second end 196. First end 194 is rotatably supported within housing 60 by a first bearing 198. Second end 196 is rotatably supported within housing 60 by a second bearing 200.

Gear 184 includes a substantially cylindrical body 206 having a plurality of external teeth 208 formed thereon. A bore 210 extends through body 206. A portion of externally threaded screw 150 extends through bore 210 and is drivingly coupled to gear 184.

Electric motor 180 includes a case 212 coupled to housing 60. Electric motor 180 also includes a spindle 214 drivingly coupled to second end 196 of worm 182. Furthermore, tooth 190 is drivingly engaged with teeth 208. In the embodiment shown, gear 184 includes 37 teeth to provide a torque multiplication factor of 37:1. Output torque from spindle 214 of electric motor 180 is multiplied by worm 182 and gear 184 to cause rotation of externally threaded screw 150.

A specific feature of worm driven clutch actuator 120 is that the worm gear mechanism may not be back driven. As such, electrical input to motor 180 may be discontinued once transfer clutch 50 is engaged and the clutch will remain in the engaged mode. Electric motor 180 is controlled to rotate worm 182 in an opposite direction to release transfer clutch 50. The use of a low torque clutch actuator 120 in conjunction with ball screw operator 122 permits use of transfer clutch 50 in high torque driveline applications yet provides superior response times compared to conventional electromagnetic or electric motor type on-demand torque transfer systems.

In operation, when mode select mechanism 56 indicates selection of the two-wheel high-range drive mode, range actuator 48 is signaled to move range sleeve 88 to its H position and transfer clutch 50 is maintained in a released condition with no electric signal sent to electric motor 180, whereby all drive torque is delivered to rear output shaft 32. If mode select mechanism 56 thereafter indicates selection of a part-time four-wheel high-range mode, range sleeve 88 is maintained in its H position and an electrical control signal is sent by controller 58 to electric motor 180 of clutch actuator 120 which causes rotation of worm 182 and gear 184. Such action causes relative rotation between screw 150 and nut 152 which, as noted, causes axial movement of nut 152 for engaging clutch pack 132. If spindle 214 is rotated in a first direction, nut 152 is advanced on screw 150 in a first axial (i.e., forward) direction such that apply plate 170 moves pressure plate 146 axially from a disengaged position until a clutch engagement force is executed on clutch pack 132 for effectively coupling hub 128 to drum 126. In contrast, if spindle 214 is rotated in a second (i.e. rearward) direction opposite the first direction, nut 152 is retracted on screw 150 in a second axial direction such that nut 152 is disengaged from contacting pressure plate 146 and torque is no longer transferred from hub 128 to drum 126.

If a part-time four-wheel low-range drive mode is selected, the operation of transfer clutch 50 and clutch actuator 120 are identical to that described above for the part-time high-range drive mode. However, in this mode, range actuator 48 is signaled to locate range sleeve 88 in its L position to establish the low-range drive connection between input shaft 46 and rear output shaft 32.

When the mode signal indicates selection of the on-demand four-wheel high-range drive mode, range actuator 48 moves or maintains range sleeve 88 in its H position and clutch actuator 120 is placed in a ready or "stand-by" condition. Specifically, the minimum amount of drive torque sent to front output shaft 42 through transfer clutch 50 in the stand-by condition can be zero or a slight amount (i.e., in the range of 2–10%) as required for the certain vehicular application. This minimum stand-by torque transfer is generated by controller 58 sending a control signal having a predetermined minimum value to electric motor 180. Thereafter, controller 58 determines when and how much drive torque needs to be transferred to front output shaft 42 based on tractive conditions and/or vehicle operating characteristics detected by vehicle sensors 54. For example, a first speed sensor 251 (FIG. 2) sends a signal to controller 58 indicative of the rotary speed of rear output shaft 32 while a second speed sensor 253 sends a signal indicative of the rotary speed of front output shaft 42. Controller 58 can vary the magnitude of the electrical signal sent to electric motor 180 between the predetermined minimum value and a predetermined maximum value based on defined relationships such as, for example, the speed difference between output shafts 32 and 42.

While transfer clutch 50 is shown arranged on front output shaft 42, it is evident that it could easily be installed on rear output shaft 32 for transferring drive torque to a transfer assembly arranged to drive front output shaft 42. Likewise, the present invention can be used as an in-line torque transfer coupling in an all wheel drive vehicle to selectively and/or automatically transfer drive torque on-demand from the primary (i.e., front) driveline to the secondary (i.e., rear) driveline. Likewise, in full-time transfer cases equipped with an interaxle differential, transfer clutch 50 could be used to limit slip and bias torque across the differential.

Figure 5:
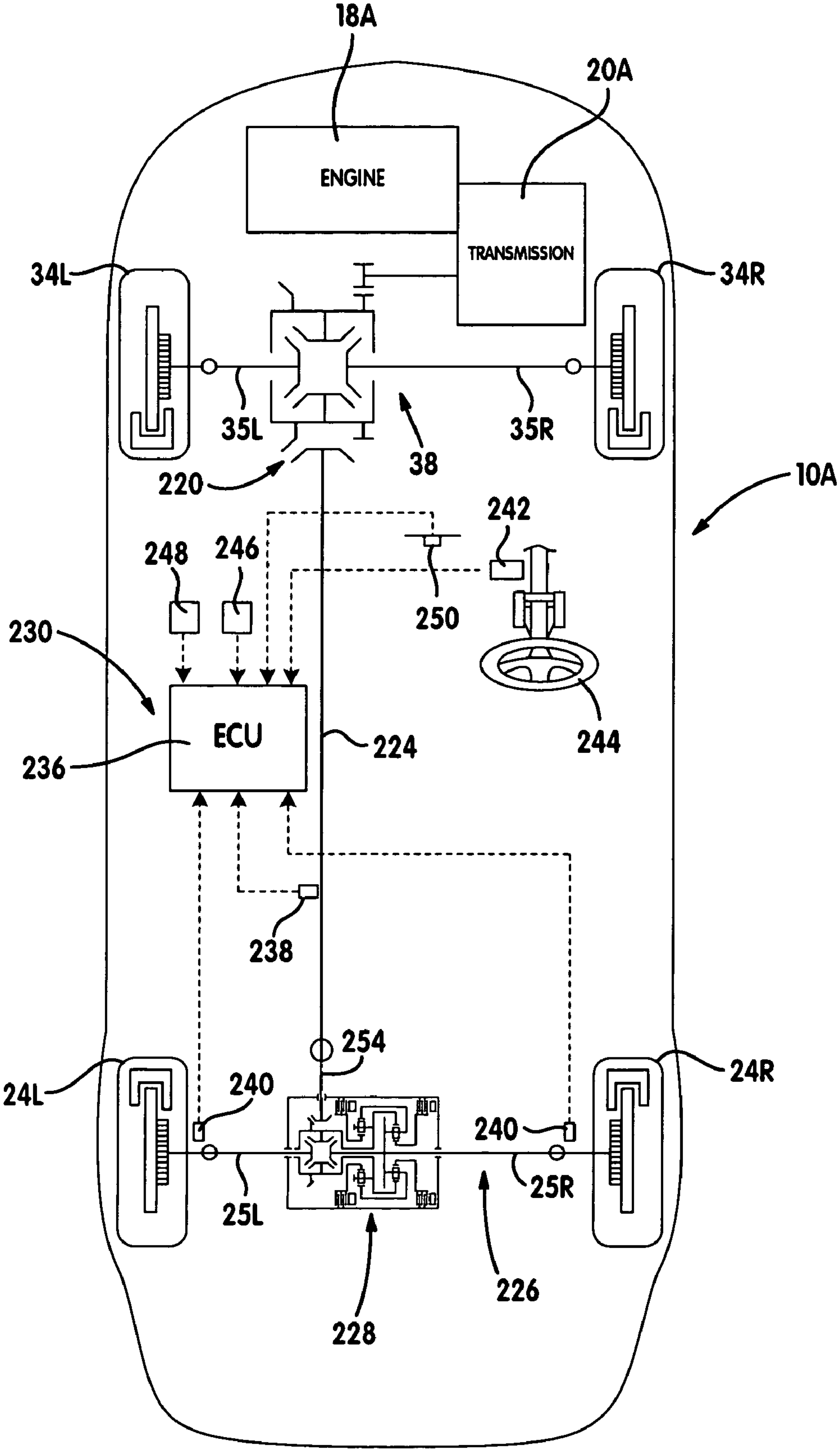
FIG. 5 is a diagrammatical illustration of an all-wheel drive motor vehicle equipped with the torque distributing drive axle and active yaw control system of the present invention.

Referring now to FIG. 5, an all-wheel drive vehicle 10A is shown to include engine 18A horizontally mounted in a front portion of the vehicle body, a transmission 20A provided integrally with engine 18A and a front differential 38 which now connects transmission 20A to front axleshafts 35L and 35R for driving left and right front wheels 34L and 34R. Vehicle 10A also includes a power transfer unit ("PTU") 220 which connects front differential 38 to a propshaft 224, and a rear axle assembly 226 having a drive mechanism 228 which connects propshaft 224 to axleshafts 25L and 25R for driving left and right rear wheels 24L and 24R. As will be detailed, drive mechanism 228 is operable in association with a yaw control system 230 for controlling the transmission of drive torque through axleshafts 25L and 25R to rear wheels 24L and 24R.

In addition to an electronic control unit (ECU) 236, yaw control system 230 includes a plurality of sensors for detecting various operational and dynamic characteristics of vehicle 10A. For example, a front wheel speed sensor 238 is provided for detecting a front wheel speed value based on rotation of propshaft 224, a pair of rear wheel speed sensors 240 are operable to detect the individual rear wheel speed values based rotation of left and right axleshafts 25L and 25R, and a steering angle sensor 242 is provided to detect the steering angle of a steering wheel 244. The sensors also include a yaw rate sensor 246 for detecting a yaw rate of the body portion of vehicle 10A, a lateral acceleration sensor 248 for detecting a lateral acceleration of the vehicle body, and a lock switch 250 for permitting the vehicle operator to intentionally shift drive mechanism 228 into a locked mode. As will be detailed, ECU 236 controls operation of a pair of transfer clutches associated with drive mechanism 228 by utilizing a control strategy that is based on input signals from the various sensors and lock switch 250.

Rear axle assembly 226 includes an axle housing 252 within which drive mechanism 228 is supported. In general, drive mechanism 228 includes an input shaft 254, a differential assembly 256, a planetary gear assembly 258, a first or "overdrive" transfer clutch 260 with a first clutch actuator 261 and a second or "underdrive" transfer clutch 262 with a second clutch actuator 263. As seen, input shaft 254 includes a pinion gear 264 that is in constant mesh with a hypoid ring gear 266. Ring gear 266 is fixed for rotation with a differential carrier 268 of differential assembly 256. Differential assembly 256 further includes a first or left output side gear 270 that is fixed for rotation with left axleshaft 25L, a second or right output side gear 272 that is fixed for rotation with right axleshaft 25R, and pinion gears 274 that are meshed with side gears 270 and 272 and rotatably mounted on pinion shafts 276 secured to differential carrier 268.

Planetary gear assembly 258 includes a first gearset 280 and a second gearset 282. First gearset 280 includes a first sun gear 284, a first ring gear 286, and a set of first planet gears 288 meshed with first sun gear 284 and first ring gear 286. Each of first planet gears 288 is rotatably supported on a post 290 extending between first and second carrier rings 292 and 294, respectively, that in combination define a first planet carrier 296. A quill shaft 298 is coaxially disposed between right axleshaft 25R and first sun gear 284 and is shown to connect second carrier ring 294 to differential carrier 268. As such, first planet carrier 296 is the input member of first gearset 280 since it is commonly driven with differential carrier 268.

Second gearset 282 includes a second sun gear 300, a second ring gear 302, and a set of second planet gears 304 meshed therewith. Each of second planet gears 304 is rotatably supported on a post 306 extending between third and fourth carrier rings 308 and 310, respectively, that in combination define a second planet carrier 312. As seen, second ring gear 302 is coupled via a first drum 314 to second carrier ring 294 for common rotation with first planet carrier 296. In addition, third carrier ring 308 is fixed for rotation with right axleshaft 25R while fourth carrier ring 310 is fixed via a second drum 316 for common rotation with first ring gear 286.

Figure 6:
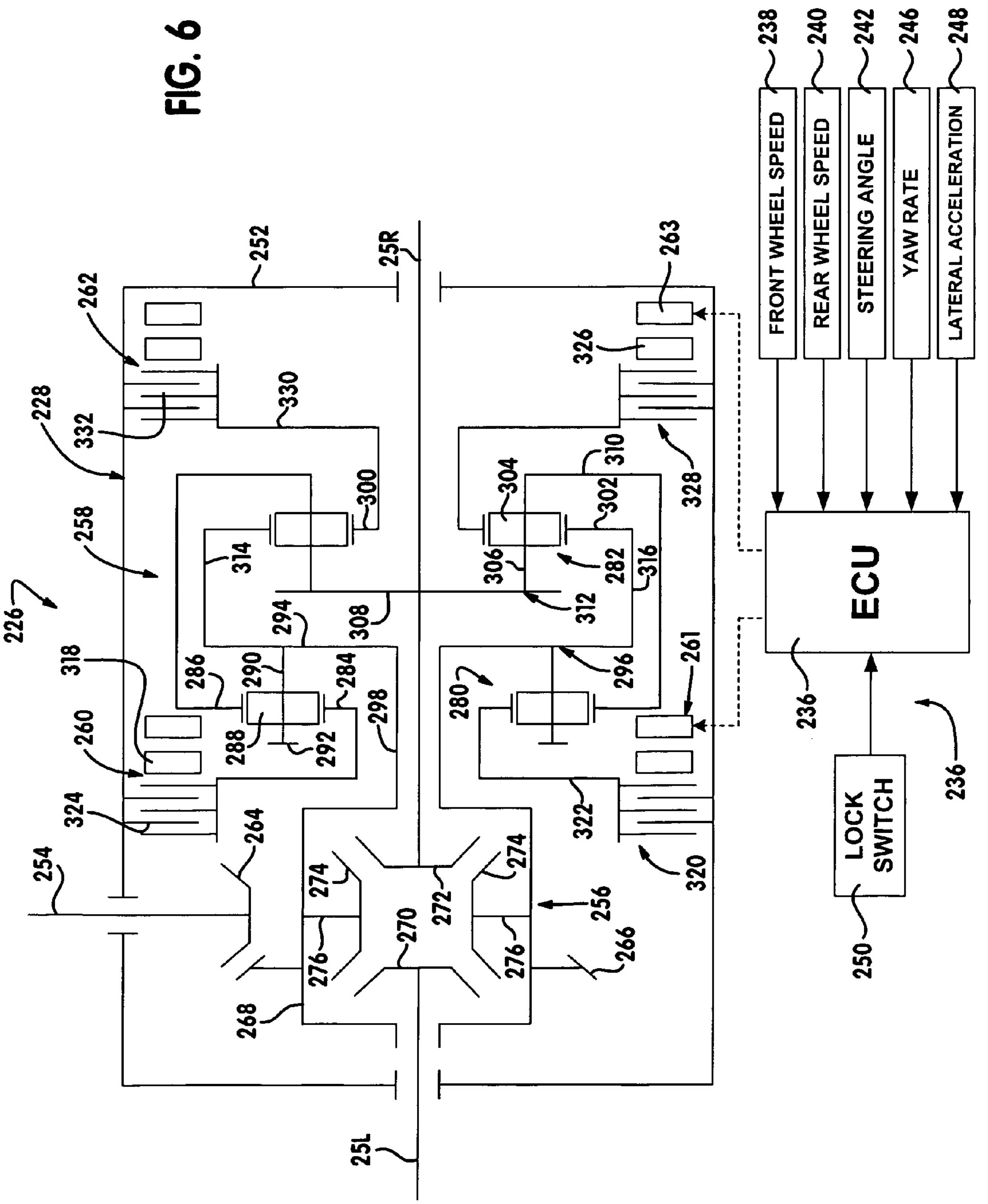
FIG. 6 is a schematic illustration of the drive axle assembly shown in FIG. 5 according to the present invention.
Figure 7:
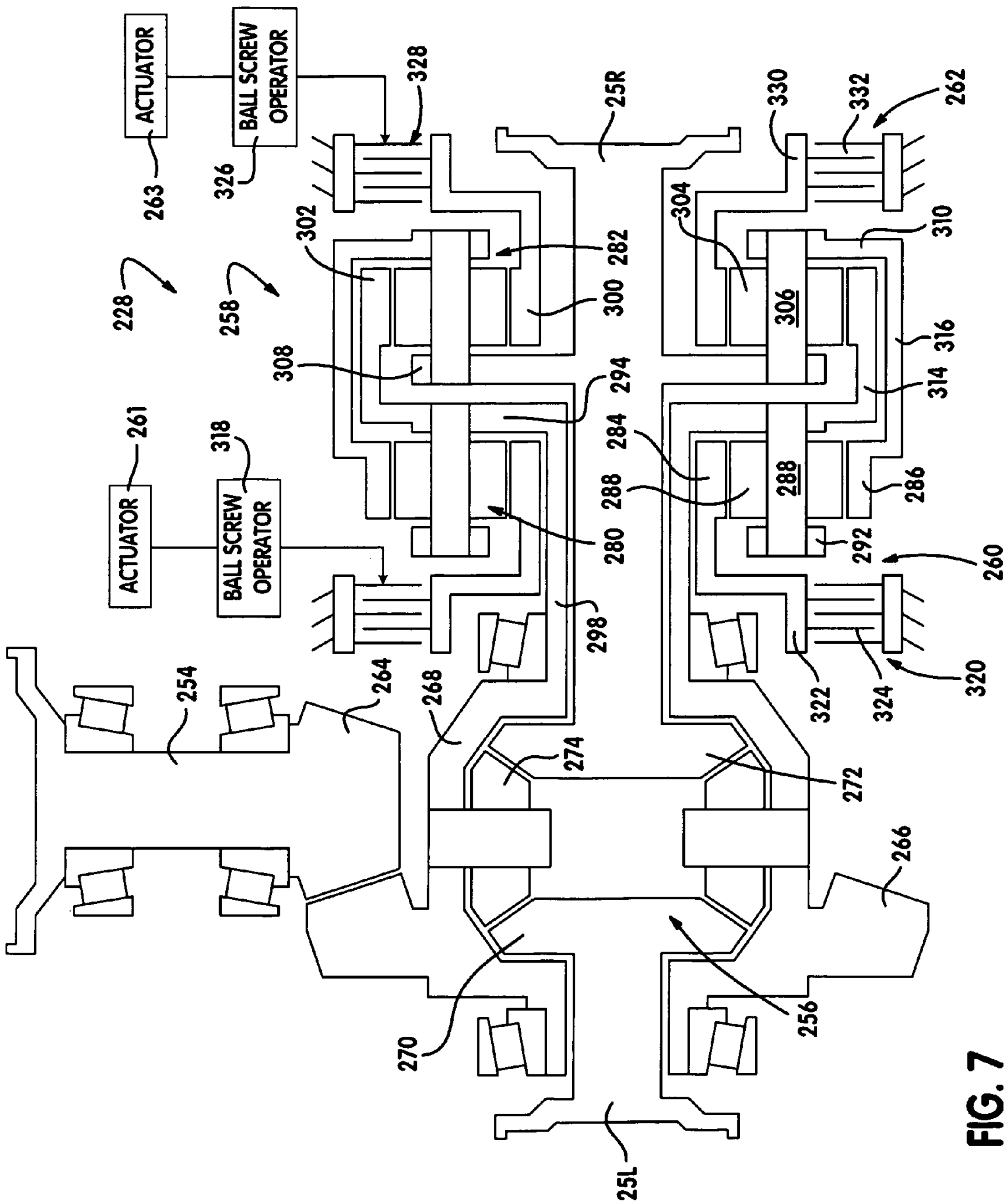
FIG. 7 is another illustration of the drive axle assembly shown in FIGS. 5 and 6.

With continued reference to FIG. 6 and 7, first transfer clutch 260 is shown to be operatively disposed between first sun gear 284 and axle housing 252 such that it is operable to selectively brake rotation of first sun gear 284. First transfer clutch 260 is schematically shown to include a ball screw operator 318 and a multi-plate clutch assembly 320. It is contemplated that ball screw operator 318 is substantially similar in structure and function than that of ball screw operator 122 previously disclosed herein. Clutch assembly 320 includes a clutch hub 322 fixed for rotation with first sun gear 284 and a multi-plate clutch pack 324 disposed between hub 322 and axle housing 252. Likewise, power-operated clutch actuator 261 is schematically shown in block format to define a worm-driven actuator having an electric motor driving a worm which, in turn, drives a worm gear fixed to a screw component of ball screw operator 318 for axially displacing a nut component relative to clutch pack 324 in a manner similar to that previously disclosed.

First transfer clutch 260 is operable in a first or "released" mode so as to permit unrestricted rotation of first sun gear 284 relative to housing 252. In contrast, first transfer clutch 260 is also operable in a second or "locked" mode for inhibiting rotation of first sun gear 284. With first sun gear 284 braked, the rotary speed of first ring gear 286 is increased which results in a corresponding increase in the rotary speed of right axleshaft 25R due to its direct connection with first ring gear 286 via second drum 316 and second planet carrier 312. Thus, right axleshaft 25R is overdriven is at a speed ratio established by the meshed gear components of first gearset 280. First transfer clutch 260 is shifted between its released and locked modes via actuation of a worm-driven electric clutch actuator 261 in response to control signals from ECU 236. Specifically, first transfer clutch 260 is operable in its released mode when clutch actuator 261 applies a predetermined minimum cutch engagement force on clutch pack 324 and is further operable in its locked mode when clutch actuator 261 applies a predetermined maximum clutch engagement force on clutch pack 324.

Second transfer clutch 262 is shown to be operably arranged between second sun gear 300 and axle housing 252. Second transfer clutch 262 is schematically shown to include a ball screw operator 326 and a multi-plate clutch assembly 328. Clutch assembly 328 includes a clutch hub 330 fixed for rotation with second sun gear 306 and a clutch pack 332 disposed between hub 330 and housing 252. Power-operated clutch actuator 263 is schematically shown in block format to define a worm-driven electric clutch actuator that is also similar to clutch actuator 120. Second transfer clutch 262 is operable in a first or "released" mode to permit unrestricted rotation of second sun gear 300. In contrast, second mode clutch 262 is also operable in a second or "locked" mode for inhibiting rotation of second sun gear 300. With second sun gear 300 braked, the rotary speed of second planet carrier 312 is reduced which results in a corresponding speed reduction in right axleshaft 25R. Thus, right axleshaft 5R is underdriven at a speed ratio determined by the gear geometry of the meshed components of second gearset 282. Second transfer clutch 262 is shifted between its released and locked modes via actuation of worm-driven clutch actuator 263 in response to control signals from ECU 236. In particular, second transfer clutch 262 operates in its released mode when clutch actuator 263 applies a predetermined minimum clutch engagement force on clutch pack 332 while it operates in its locked mode when clutch actuator 263 applies a predetermined maximum clutch engagement force on clutch pack 332.

In accordance with the arrangement shown, drive mechanism 228 is operable in coordination with yaw control system 230 to potentially establish at least four distinct operational modes for controlling the transfer of drive torque from input shaft 254 to axleshafts 25L and 5R. In particular, a first operational mode can be established when first transfer clutch 260 and second transfer clutch 262 are both in their released mode such that differential assembly 256 acts as an "open" differential so as to permit unrestricted speed differentiation with drive torque transmitted from differential carrier 268 to each axleshaft 25L, 25R based on the tractive conditions at each corresponding rear wheel 24L, 24R. A second operational mode can be established when both first transfer clutch 260 and second transfer clutch 262 are in their locked mode such that differential assembly 256 acts as a "locked" differential with no speed differentiation permitted between rear axleshafts 25L and 25R. This mode can be intentionally selected via actuation of lock switch 250 when vehicle 10A is being operated off-road or on poor roads.

A third operational mode can be established when first transfer clutch 260 is shifted into its locked mode while second transfer clutch 262 is operable in its released mode. With first sun gear 284 held against rotation, rotation of first planet carrier 296 due to driven rotation of differential carrier 268 causes first ring gear 286 to be driven at an increased speed relative to differential carrier 268. As a result, right axleshaft 25R is overdriven at the same increased speed of first ring gear 286 due to its connection thereto via second drum 316 and second planet carrier 312. Such an increase in speed in right axleshaft 25R causes a corresponding speed reduction in left axleshaft 25L. Thus, left axleshaft 25L is underdriven while right axleshaft 25R is overdriven to accommodate the current tractive or steering condition detected and/or anticipated by ECU 236 based on the particular control strategy used.

A fourth operational mode can be established when first transfer clutch 260 is shifted into its released mode and transfer mode clutch 262 is shifted into its locked mode. With second sun gear 300 held against rotation and second ring gear 302 driven at a common speed with differential carrier 268, second planet carrier 312 is driven at a reduced speed. As a result, right rear axleshaft 25R is underdriven relative to differential carrier 268 which, in turn, causes left axleshaft 25L to be overdriven at a corresponding increased speed. Thus, left axleshaft 25L is overdriven while right axleshaft 25R is underdriven to accommodate the current tractive or steering conditions detected and/or anticipated by ECU 236.

In addition to on-off control of the transfer clutches for establishing the various drive modes associated with direct and underdrive connections through the planetary gearsets, it is further contemplated that variable clutch engagement forces can be generated by the power-operated clutch actuators to adaptively control the left-to-right speed and torque characteristics. This adaptive control feature functions to provide enhanced yaw and stability control for vehicle 10A. For example, a "reference" yaw rate can be determined based on the steering angle detected by steering angle sensor 242, a vehicle speed calculated based on signals from the various speed sensors, and a lateral acceleration detected by lateral acceleration sensor 248 during turning of vehicle 10A. ECU 236 compares this reference yaw rate with an "actual" yaw rate detected by yaw sensor 246. This comparison will determine whether vehicle 10A is in an understeer or an oversteer condition so as to permit yaw control system 230 to accurately adjust or accommodate for these types of steering tendencies. ECU 236 can address such conditions by shifting drive mechanism 228 into the specific operative drive mode that is best suited to correct the actual or anticipated oversteer or understeer situation. Optionally, variable control of the transfer clutches also permits adaptive regulation of the side-to-side torque and speed characteristics if one of the distinct drive modes is not adequate to accommodate the current steer tractive condition.

Figure 8:
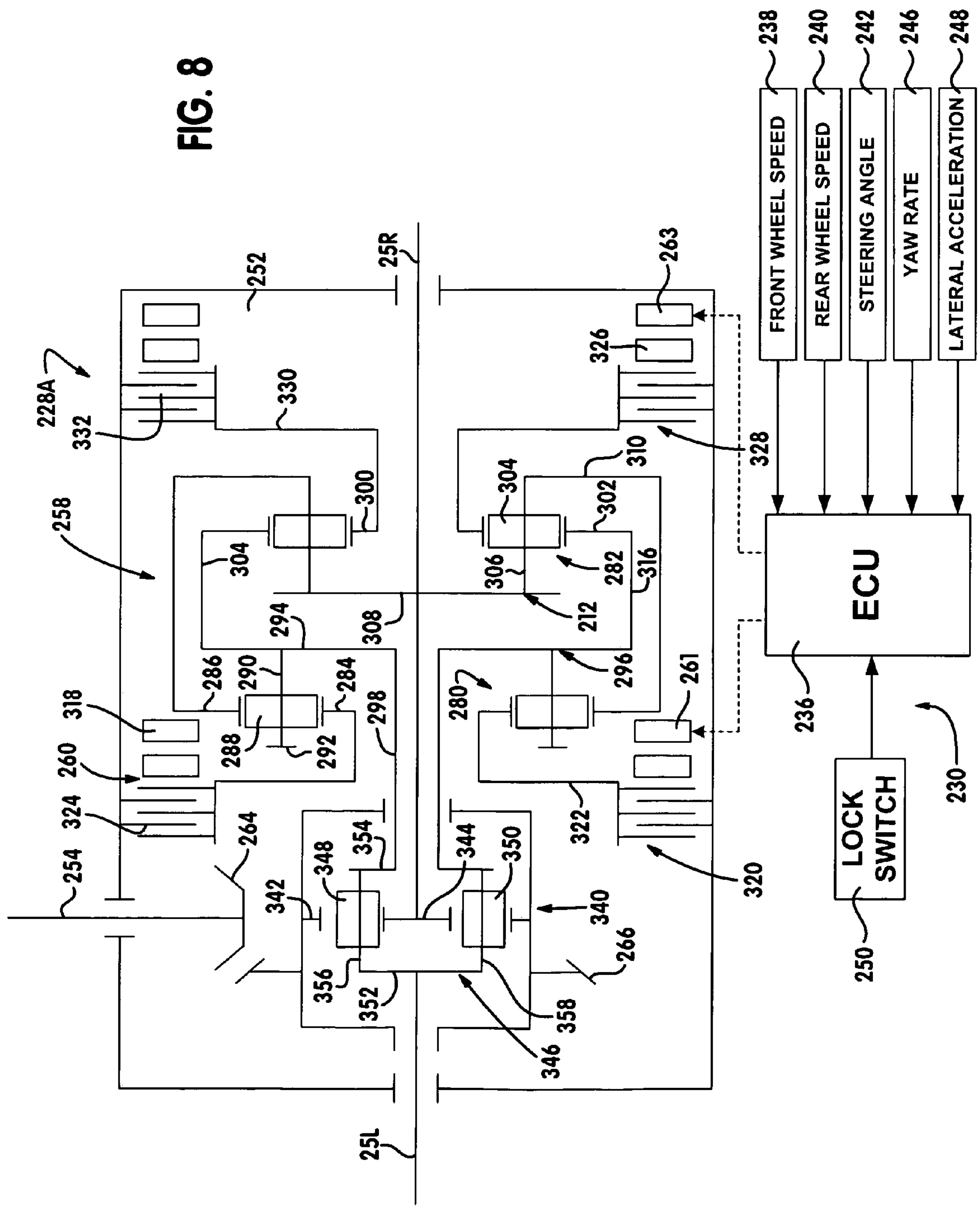
FIG. 8 is a schematic illustration of an alternative embodiment of the drive axle assembly of the present invention.

Referring now to FIG. 8, an alternative embodiment of drive mechanism 228 is shown and designated by reference numeral 228A. Generally speaking, a large number of components are common to both drive mechanism 228 and 228A, with such components being identified by the same reference numbers. However, drive mechanism 228A is shown to include a modified differential assembly 340 of the planetary type having a ring gear 342 driven by hypoid ring gear 266 so as to act as its input component. Differential assembly 340 further includes a sun gear 344 fixed for common rotation with right axleshaft 25R, a differential carrier 346 fixed for common rotation with left axleshaft 25L, and meshed sets of first pinions 348 and second pinions 350. Planet carrier 346 includes a first carrier ring 352 fixed to left axleshaft 25L, a second carrier ring 354 fixed to quill shaft 298, a set of first pins 356 extending between the carrier rings and on which first pinions 348 are rotatably supported, and a set of second pins 358 also extending between the carrier rings and rotatably supporting second pinions 350 thereon. First pinions 348 are meshed with sun gear 344 while second pinions 350 are meshed with ring gear 342. As seen, quill shaft 298 connects differential carrier 346 for common rotation with planet carrier 296 of first gearset 280.

Drive mechanism 228A is similar in operation to drive mechanism 228 in that first transfer clutch 260 functions to cause right axleshaft 25R to be overdriven while second mode clutch 262 functions to cause right axleshaft 25R to be underdriven. As such, the four distinct operational modes previously described are again available and can be established by drive mechanism 228A via selective actuation of power-operated clutch actuators 261 and 263.

Figure 9:
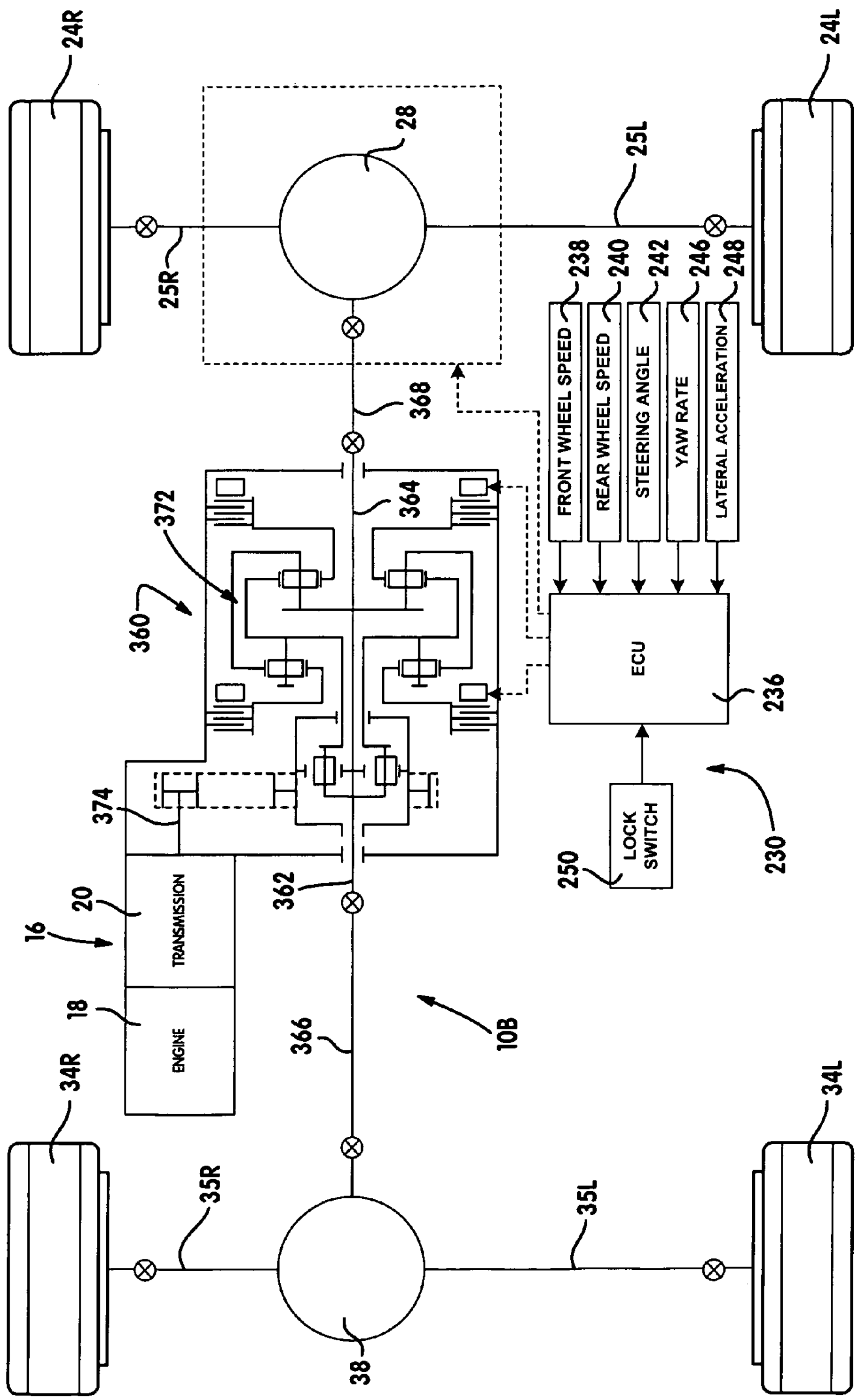
FIG. 9 is a diagrammatical illustration of the torque distributing differential assembly of the present invention installed in a power transfer unit for use in a four-wheel drive vehicle.

Referring now to FIG. 9, a four-wheel drive vehicle 10B is shown with a power transfer unit 360 operable for transferring drive torque from the output of transmission 20 to a first (i.e., front) output shaft 362 and a second (i.e., rear) output shaft 364. Front output shaft 362 drives a front propshaft 366 which, in turn, drives front differential 38 for driving front wheels 34L and 34R. Likewise, rear output shaft 364 drives a rear propshaft 368 which, in turn, drives a rear differential 28 for driving rear wheels 24L and 24R. Power transfer unit 360, otherwise known as a transfer case, includes a torque distribution mechanism 372 which functions to transmit drive torque from its input shaft 374 to both of output shafts 362 and 364 so as to bias the torque distribution ratio therebetween, thereby controlling the tractive operation of vehicle 10B. As seen, torque distribution mechanism 372 is operably associated with traction control system 230 for providing this adaptive traction control feature.

Figure 10:
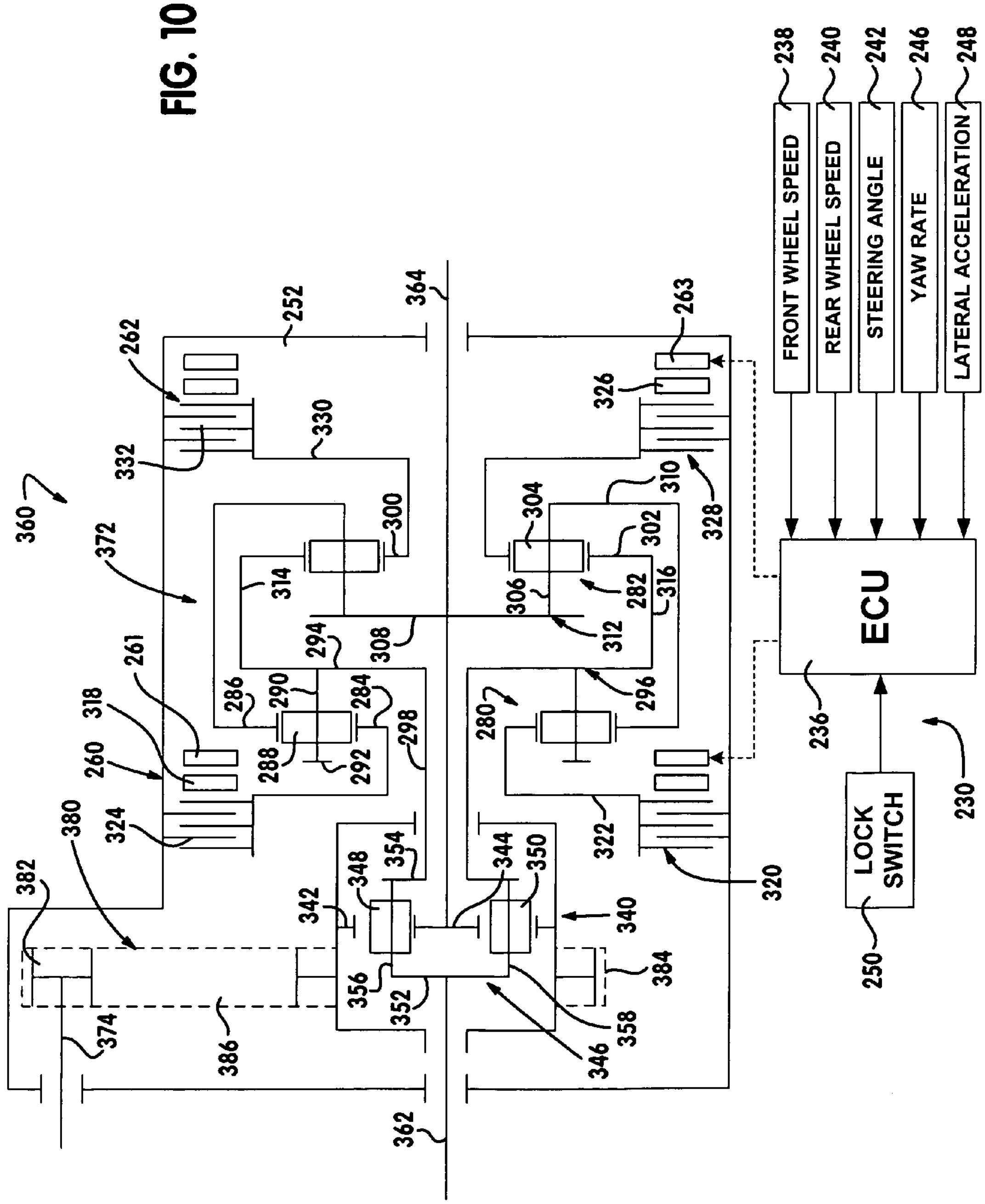
FIG. 10 is a schematic drawing of the transfer unit shown in FIG. 6.

Referring primarily to FIG. 10, torque distribution mechanism 372 of power transfer unit 360 is shown to be generally similar in structure to drive mechanism 228A of FIG. 8 with the exception that ring gear 342 is now drivingly connected to input shaft 374 via a transfer assembly 380. In the arrangement shown, transfer assembly 380 includes a first sprocket 382 driven by input shaft 374, a second sprocket 384 driving ring gear 342, and a power chain 386 therebetween. As seen, front output shaft 362 is driven by differential carrier 346 of differential unit 340 which now acts as a center or "interaxle" differential for permitting speed differentiation between the front and rear output shafts. In addition, sun gear 344 of differential unit 340 drives rear output shaft 364. Also, planet carrier 312 of second gearset 282 is coupled to rear output shaft 364.

Control over actuation of transfer clutches 260 and 262 results in corresponding increases or decreases in the rotary speed of rear output shaft 364 relative to front output shaft 362, thereby controlling the amount of drive torque transmitted therebetween. In particular, with both transfer clutches released, unrestricted speed differentiation is permitted between the output shafts while the gear ratio established by the components of interaxle differential unit 340 controls the front-to-rear torque ratio based on the current tractive conditions of the front and rear wheels. In contrast, with both transfer clutches engaged, a locked four-wheel drive mode is established wherein no interaxle speed differentiation is permitted between the front and rear output shafts. Such a drive mode can be intentionally selected via lock switch 250 when vehicle 10B is driven off-road or during severe road conditions. An adaptive four-wheel drive mode is made available under control of traction control system 230 to vary the front-rear drive torque distribution ratio based on the tractive needs of the front and rear wheels as detected by the various sensors. In addition to power transfer unit 360, vehicle 10B could also be equipped with a rear axle assembly having either drive mechanism 228 or 228A and its corresponding yaw control system, as is identified by the phantom lines in FIG. 9.

Figure 11:
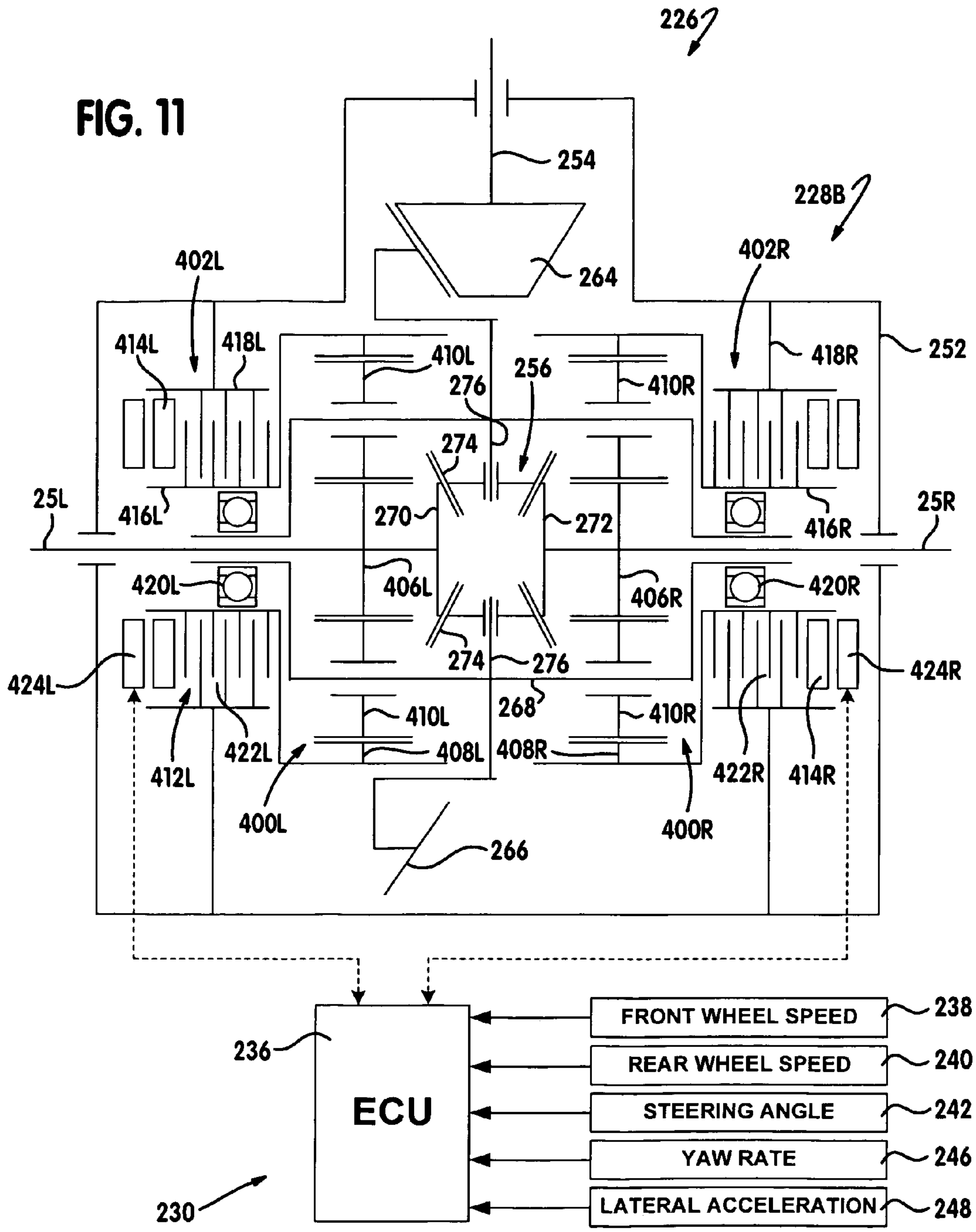
FIGS. 11–14 illustrate additional embodiments of a torque distributing drive axle assembly according to the present invention.

Referring now to FIG. 11, another embodiment of a drive mechanism 228B for use in drive axle assembly 226 is disclosed. As seen, drive axle assembly 226 includes axle housing 252 within which drive mechanism 228B is supported. In general, torque distributing drive mechanism 228B includes input shaft 254, differential 256, a first or left speed changing unit 400L, a second or right speed changing unit 400R, a first or left transfer clutch 402L and a second or right transfer clutch 402R. As before, input shaft 254 includes a pinion gear 264 that is in constant mesh with a hypoid ring gear 266. Ring gear 266 is fixed for rotation with carrier 268 associated with differential 256. Differential 256 is operable to transfer drive torque from carrier 268 to axleshafts 25L and 25R while permitting speed differentiation therebetween. Differential 256 includes a first or left side gear 270 fixed for rotation with left axleshaft 25L, a second or right side gear 272 fixed for rotation with right axleshaft 25R, and at least one pair of pinion gears 274 rotatably supported on pinion shafts 276 that are fixed for rotation with carrier 268.

Left speed changing unit 400L is a planetary gearset having a sun gear 406L fixed for rotation with left axleshaft 25L, a ring gear 408L, and a plurality of planet gears 410L rotatably supported by carrier 268 and which are meshed with both sun gear 406L and ring gear 408L. Right speed changing unit 400R is generally identical to left speed changing unit 400L and is shown to include a sun gear 406R fixed for rotation with right axleshaft 25R, a ring gear 408R, and a plurality of planet gears 410R rotatably supported by carrier 268 and meshed with both sun gear 400R and ring gear 408R.

With continued reference to FIG. 11, first transfer clutch 402L is shown to be operably disposed between ring gear 408L of first speed changing unit 400L and housing 252. First transfer clutch 402L includes a multi-plate clutch assembly 412L and a ball screw operator 414L which is contemplated to be similar in structure to ball screw operator 122. Clutch assembly 412L includes a clutch hub 416L that is connected for common rotation with ring gear 408L and a drum 418L that is non-rotatably fixed to housing 252. As seen, a bearing assembly 420L supports hub 416L for rotation relative to carrier 268. In addition, a multi-plate clutch pack 422L is operably disposed between drum 418L and hub 416L. A first clutch actuator 424L is schematically shown to define a motor-driven worm-type clutch actuator similar to clutch actuator 120.

First transfer clutch 402L is operable in a first or "released" mode so as to permit unrestricted rotation of ring gear 408L. In contrast, first transfer clutch 402L is also operable in a second or "locked" mode to brake rotation of ring gear 408L, thereby causing sun gear 406L to be driven at an increased rotary speed relative to carrier 268. Thus, first transfer clutch 402L functions in its locked mode to increase the rotary speed of left axleshaft 25L which, in turn, causes differential 256 to generate a corresponding decrease in the rotary speed of right axleshaft 25R, thereby directing more drive torque to left axleshaft 25L than is transmitted to right axleshaft 25R. Specifically, an increase in the rotary speed of left axleshaft 25L caused by speed changing gearset 400L causes a corresponding increase in the rotary speed of first side gear 270L which, in turn, causes pinions 274 to drive right side gear 272 at a corresponding reduced speed. First transfer clutch 402L is shifted between its released and locked modes via actuation of power-operated clutch actuator 424L in response to control signals from ECU 236. Specifically, first transfer clutch 402L is operable in its released mode when clutch actuator 424L applies a predetermined minimum clutch engagement force on clutch pack 422L and is further operable in its locked mode when clutch actuator 424L applies a predetermined maximum clutch engagement force on clutch pack 422L.

Second transfer clutch 402R is shown to be operably disposed between ring gear 408R of second speed changing unit 400R and housing 252. Second transfer clutch 402R includes a multi-plate clutch assembly 412R and a ball screw operator 414R. In particular, clutch assembly 412R includes a clutch hub 416R that is fixed for rotation with ring gear 408R, a drum 418R non-rotatably fixed to housing 252, and a multi-plate clutch pack 422R operably disposed between hub 416R and drum 418R. A second clutch actuator 424R is also schematically shown to define a motor-driven worm-type clutch actuator similar to clutch actuator 122.

Second transfer clutch 402R is operable in a first or "released" mode so as to permit unrestricted relative rotation of ring gear 408R. In contrast, second transfer clutch 402R is also operable in a second or "locked" mode to brake rotation of ring gear 408R, thereby causing the rotary speed of sun gear 406R to be increased relative to carrier 268. Thus, second transfer clutch 402R functions in its locked mode to increase the rotary speed of right axleshaft 25R which, in turn, causes differential 256 to decrease the rotary speed of left axleshaft 25L, thereby directing more drive torque to right axleshaft 25R than is directed to left axleshaft 25L. Second transfer clutch 402R is shifted between its released and locked modes via actuation of clutch actuator 424R in response to control signals from ECU 236. In particular, second transfer clutch 402R operates in its released mode when clutch actuator 424R applies a predetermined minimum clutch engagement force on clutch pack 422R while it operates in its locked mode when clutch actuator 424R applies a predetermined maximum clutch engagement force on clutch pack 422R.

In accordance with the arrangement shown, torque distributing drive mechanism 228B is operable in coordination with yaw control system 230 to establish at a least three distinct operational modes for controlling the transfer of drive torque from input shaft 254 to axleshafts 25L and 25R. In particular, a first operational mode is established when first transfer clutch 402L and second transfer clutch 402R are both in their released mode such that differential 256 acts as an "open" differential so as to permit unrestricted speed differentiation with drive torque transmitted from carrier 268 to each axleshaft 25L and 25R based on the tractive conditions at each corresponding rear wheel 24L and 24R.

A second operational mode is established when first transfer clutch 402L is in its locked mode while second transfer clutch 402R is in its released mode. As a result, left axleshaft 25L is overdriven by first speed changing unit 400L due to the braking of ring gear 408L. As noted, such an increase in the rotary speed of left axleshaft 25L causes a corresponding speed decrease in right axleshaft 25R. Thus, this second operational mode causes right axleshaft 25R to be underdriven while left axleshaft 25L is overdriven when such an unequal torque distribution is required to accommodate the current tractive or steering condition detected and/or anticipated by ECU 236 and based on the particular control strategy used. A third operational mode is established when first transfer clutch 402L is shifted into its released mode and second transfer clutch 402R is shifted into its locked mode. As a result, right axleshaft 25R is overdriven relative to carrier 268 by second speed changing unit 400R which, in turn, causes left axleshaft 25L to be underdriven by differential 256 at a corresponding reduced speed. Accordingly, drive mechanism 228B can be controlled to function as both a limited slip differential and a torque vectoring device.

Figure 12:
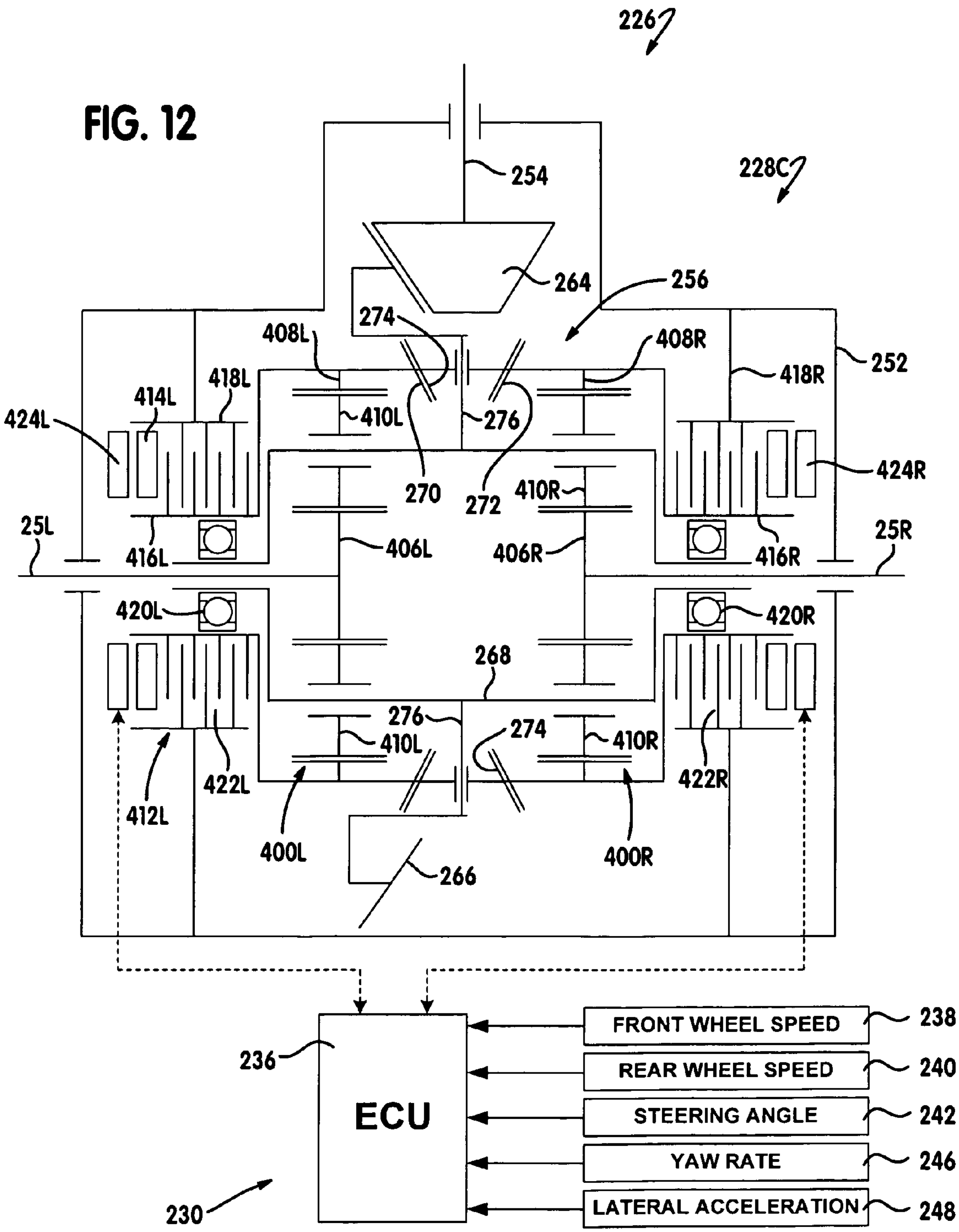

Referring now to FIG. 12, a modified version of drive mechanism 228B from FIG. 11 is shown and hereinafter referred to as drive mechanism 228C. Again, common components are identified with the same reference numerals. In this embodiment, however, differential 256 has been moved outboard of carrier 268 rather than the inboard arrangement shown in FIG. 11. To accomplish this, left side gear 270 is now shown to be fixed for rotation with ring gear 408L while right side gear 272 is shown to be fixed for rotation with ring gear 408R. Pinions 274 are still rotatably mounted on pinion shafts 276 that couple ring gear 266 to carrier 268. Drive mechanism 228C also works in conjunction with yaw control system 230 to establish the three distinct operational modes. As before, with both transfer clutches released, differential 256 acts as an open differential with side gears 270 and 272 driving corresponding ring gears 408L and 408R which, in turn, transfers drive torque to axleshafts 25L and 25R through speed changing gearsets 400L and 400R, respectively.

Drive mechanism 228C is also operable when first transfer clutch 402L is locked and second transfer clutch 402R is released to have first gearset 400L overdrive left axleshaft 25L relative to ring gear 266 and carrier 268. Specifically, with ring gear 408L braked, left side gear 270 is likewise braked such that pinions 274 cause right side gear 272 to be rotated at an increased speed. This increased rotary speed of side gear 272 causes corresponding rotation of ring gear 408R which, in turn, causes sun gear 406R to drive right axleshaft 25R at a reduced speed. In contrast, when first transfer clutch 402L is released and second transfer clutch 402R is locked, second gearset 400R overdrives right axleshaft 25R due to braking of ring gear 408R. In addition, the concurrent braking of side gear 270 causes a corresponding increase in rotary speed of side gear 270 which, in turn, drives ring gear 408L so as to reduce the rotary speed of sun gear 406L and left axleshaft 25L.

Figure 13:
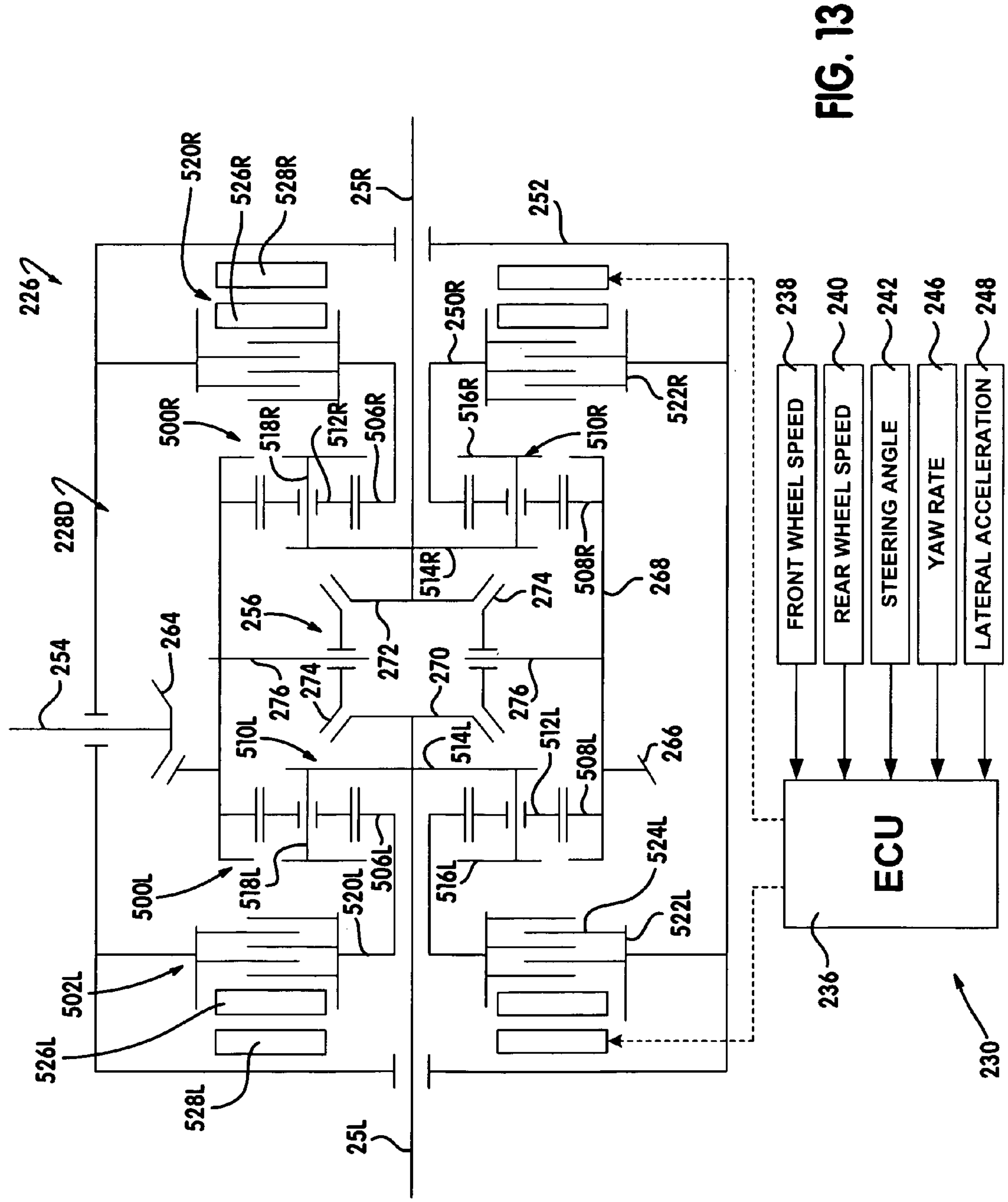

Referring now to FIG. 13, rear axle assembly 226 is shown to include a drive mechanism 228D. In general, torque distributing drive mechanism 228D includes input shaft 254, differential 256, a first or left speed changing unit 500L, a second or right speed changing unit 500R, a first or left transfer clutch 502L and a second or right transfer clutch 502R. Left speed changing unit 500L is a planetary gearset having a sun gear 506L supported for rotation relative to left axleshaft 25L, a ring gear 508L fixed for rotation with differential carrier 268, a planet carrier 510L fixed for rotation with left axleshaft 25L, and a plurality of planet gears 512L rotatably supported on planet carrier 510L and which are meshed with both sun gear 506L and ring gear 508L. As seen, planet carrier 510L includes a first carrier ring 514L that is fixed to axleshaft 25L, a second carrier ring 516L and pins 518L therebetween on which planet gears 512L are rotatably supported. Right speed changing unit 500R is generally identical to left speed changing unit 500L and is shown to include a sun gear 506R supported for rotation relative to right axleshaft 25R, a ring gear 508R fixed for rotation with differential carrier 268, a planet carrier 510R fixed for rotation with right axleshaft 25R, and a plurality of planet gears 512R rotatably supported on planet carrier 510R and which are meshed with both sun gear 506R and ring gear 508R. Planet carrier 510R also includes a first carrier ring 514R that is fixed to axleshaft 25R, a second carrier ring 516R and pins 518R therebetween on which planet gears 512R are rotatably supported.

With continued reference to FIG. 13, first transfer clutch 502L is shown to be operably disposed between sun gear 506L of first speed changing unit 500L and housing 252. In particular, first transfer clutch 502L includes a clutch hub 520L that is connected for common rotation with sun gear 506L and a drum 522L that is non-rotatably fixed to housing 252. First transfer clutch 506L also includes a multi-plate clutch pack 524L that is operably disposed between drum 522L and hub 520L, and a ball screw operator 526L. First transfer clutch 502L is operable in a first or “released” mode so as to permit unrestricted rotation of sun gear 506L. In contrast, first transfer clutch 502L is also operable in a second or “locked” mode to brake rotation of sun gear 506L, thereby causing planet carrier 510L to be driven at a reduced rotary speed relative to differential carrier 268. Thus, first mode clutch 506L functions in its locked mode to decrease the rotary speed of left axleshaft 25L which, in turn, causes differential 256 to generate a corresponding increase in the rotary speed of right axleshaft 25R, thereby directing more drive torque to right axleshaft 25R than is transmitted to left axleshaft 25L. Specifically, the reduced rotary speed of left axleshaft 25L caused by engagement of speed changing gearset 500L causes a corresponding decrease in the rotary speed of left side gear 270 which, in turn, causes pinions 274 to drive right side gear 272 and right axleshaft 25R at a corresponding increased speed. First transfer clutch 502L is shifted between its released and locked modes via actuation of power-operated clutch actuator 528L in response to control signals from ECU 336. It is contemplated that clutch actuator 528L is a motor-driven worm-type clutch actuator similar to that previously disclosed. Specifically, first transfer clutch 502L is operable in its released mode when clutch actuator 528L applies a predetermined minimum clutch engagement force on clutch pack 524L and is further operable in its locked mode when clutch actuator 528L applies a predetermined maximum clutch engagement force on clutch pack 524L.

Second transfer clutch 502R is shown to be operably disposed between sun gear 506R of second speed changing unit 500R and housing 252. In particular, second transfer clutch 502R includes a clutch hub 520R that is fixed for rotation with sun gear 506R, a drum 522R non-rotatably fixed to housing 252, a multi-plate clutch pack 524R operably disposed between hub 520R and drum 522R and a ball screw operator 526R. Second transfer clutch 502R is operable in a first or “released” mode so as to permit unrestricted relative rotation of sun gear 506R. In contrast, second transfer clutch 502R is also operable in a second or “locked” mode to brake rotation of sun gear 506R, thereby causing the rotary speed of planet carrier 510R to be decreased relative to differential carrier 268. Thus, second transfer clutch 502R functions in its locked mode to decrease the rotary speed of right axleshaft 25R which, in turn, causes differential 256 to increase the rotary speed of left axleshaft 25L, thereby directing more drive torque to left axleshaft 25L than is directed to right axleshaft 25R. Second transfer clutch 502R is shifted between its released and locked modes via actuation of power-operated clutch actuator 528R in response to control signals from ECU 236. In particular, second transfer clutch 528R operates in its released mode when clutch actuator 528R applies a predetermined minimum clutch engagement force on clutch pack 524R while it operates in its locked mode when clutch actuator 528R applies a predetermined maximum clutch engagement force on clutch pack 524R.

In accordance with the arrangement shown, torque distributing drive mechanism 228D is operable in coordination with yaw control system 230 to establish at a least three distinct operational modes for controlling the transfer of drive torque from input shaft 254 to axleshafts 25L and 25R. In particular, a first operational mode is established when first transfer clutch 502L and second transfer clutch 502R are both in their released mode such that differential 256 acts as an “open” differential so as to permit unrestricted speed differentiation with drive torque transmitted from differential carrier 268 to axleshafts 25L and 25R based on the tractive conditions at corresponding rear wheels 24L and 24R. A second operational mode is established when first transfer clutch 502L is in its locked mode while second transfer clutch 502R is in its released mode. As a result, left axleshaft 25L is underdriven by first speed changing unit 500L due to braking of sun gear 506L. As noted, such a decrease in the rotary speed of left axleshaft 25L causes a corresponding speed increase in right axleshaft 25R. Thus, this second operational mode causes right axleshaft 25R to be overdriven while left axleshaft 25L is underdriven whenever such an unequal torque distribution is required to accommodate the current tractive or steering condition detected and/or anticipated by ECU 236. Likewise, a third operational mode is established when first transfer clutch 502L is shifted into its released mode and second transfer clutch 502R is shifted into its locked mode. As a result, right axleshaft 25R is underdriven relative to differential carrier 268 by second speed changing unit 500R which, in turn, causes left axleshaft 25L to be overdriven at a corresponding increased speed. Accordingly, drive mechanism 228D can be controlled to function as both a limited slip differential and a torque vectoring device.

Figure 14:
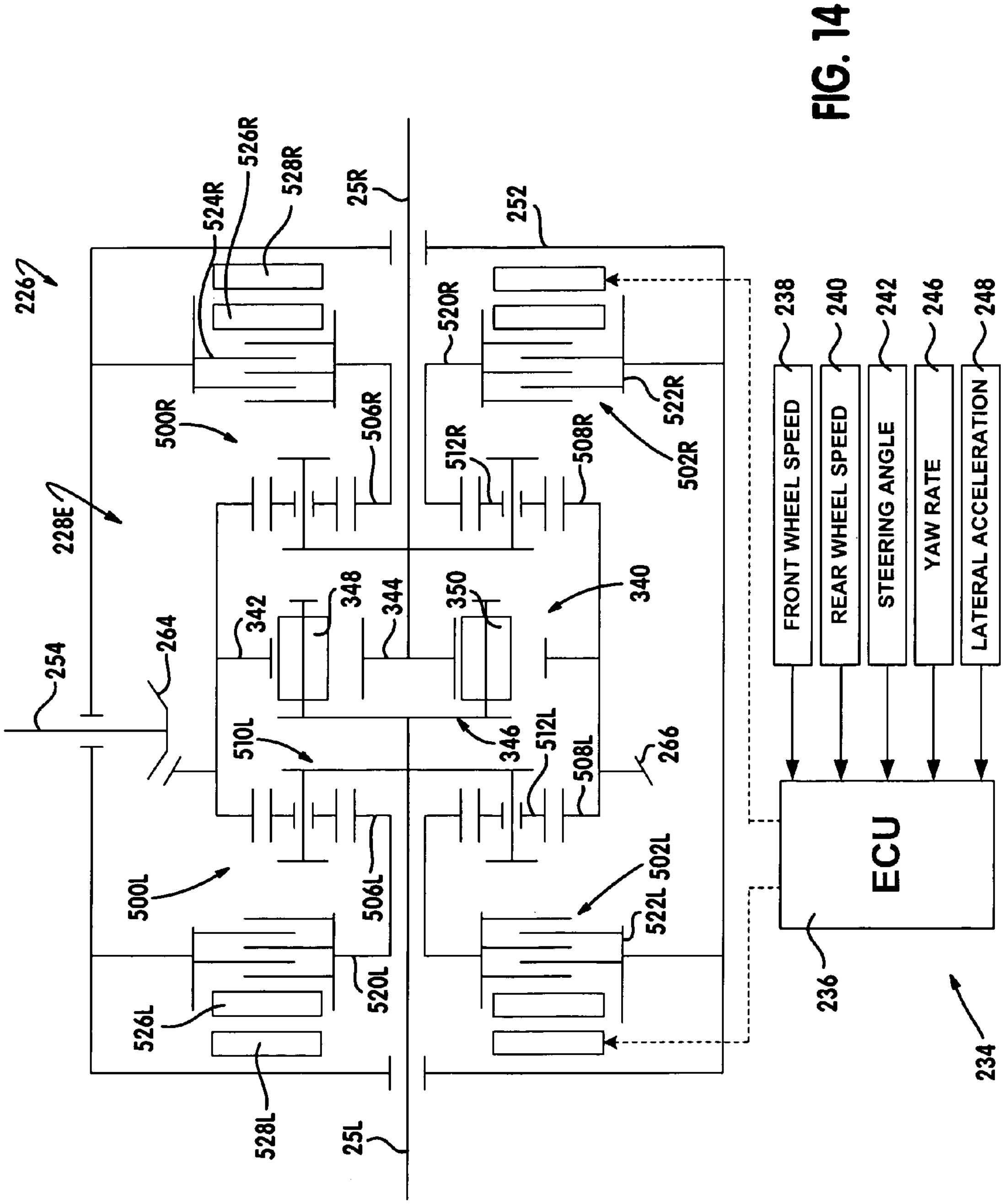

Referring now to FIG. 14, a modified version of drive mechanism 228D is shown and hereinafter referred to as drive mechanism 228E. Again, common reference numbers are used to identify similar components. In this embodiment, however, bevel differential 256 has been replaced with planetary differential 140.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive axle assembly for use in a motor vehicle having a powertrain and first and second wheels, comprising;

an input shaft driven by the powertrain;

a first axleshaft driving the first wheel;

a second axleshaft driving the second wheel;

a differential having an input component driven by said input shaft, a first output component driving said first axleshaft and a second output component driving said second axleshaft;

a first speed changing unit having a first sun gear driven by said first output component, a first ring gear, and a set of first planet gears meshed with said first sun gear and said first ring gear;

a second speed changing unit having a second sun gear driven by said second output component, a second ring gear, and a set of second planet gears meshed with said second sun gear and said second ring gear;

a first friction clutch selectively engageable to brake rotation of said first ring gear;

a first clutch actuator for controlling engagement of said first friction clutch and including a first operator unit for applying a clutch engagement force to said first friction clutch, a first worm drive mechanism coupled to said first operator unit and first electric motor driving said first worm drive mechanism;

a second friction clutch selectively engageable to brake rotation of said second ring gear;

a second clutch actuator for controlling engagement of said second friction clutch and including a second operator unit for applying a clutch engagement force on said second friction clutch, a second worm drive mechanism coupled to said second operator unit and a second electric motor driving said second worm drive mechanism; and a control system for controlling actuation of said first and second electric motors.

2. The drive axle assembly of claim 1 wherein said first operator unit is a first ball screw unit having a rotary screw component and a nut component supported on said screw component for axial movement relative to said first friction clutch in response to rotation of said screw component, and wherein said first worm drive mechanism includes a worm gear fixed to said rotary screw which is meshed with a worm driven by said first electric motor.

3. The drive axle assembly of claim 1 wherein a first drive mode is established when said first friction clutch is engaged and said second friction clutch is released, whereby said first axleshaft is overdriven relative to said input component and said differential causes said second axleshaft to be underdriven relative to said input component.

4. The drive axle assembly of claim 3 wherein a second drive mode is established when said first friction clutch is released and said second friction clutch is engaged, whereby said second axleshaft is overdriven relative to said input component and said differential causes said first axleshaft to be underdriven relative to said input component.

5. A drive axle assembly for use in a motor vehicle having a powertrain and first and second wheels, comprising:

an input shaft driven by the powertrain;

a first axleshaft driving the first wheel;

a second axleshaft driving the second wheel;

a differential having an input component driven by said input shaft and first and second output components;

a first speed changing unit having a first sun gear driving said first axleshaft, a second ring gear driven by said first output component, and a set of first planet gears meshed with said first sun gear and said first ring gear;

a second speed changing unit having a second sun gear driving said second axleshaft, a second ring gear driven by said second output component, and a set of second planet gears meshed with said second sun gear and said second ring gear;

a first friction clutch selectively engageable to brake rotation of said first ring gear;

a first clutch actuator for controlling engagement of said first friction clutch and including a first operator unit for applying a clutch engagement force to said first friction clutch, a first worm drive mechanism coupled to said first operator unit and first electric motor driving said first worm drive mechanism;

a second friction clutch selectively engageable to brake rotation of said second ring gear;

a second clutch actuator for controlling engagement of said second friction clutch and including a second operator unit for applying a clutch engagement force on said second friction clutch, a second worm drive mechanism coupled to said second operator unit and a second electric motor driving said second worm drive mechanism; and a control system for controlling actuation of said first and second electric motors.

6. The drive axle assembly of claim 5 wherein said first operator unit is a first ball screw unit having a rotary screw component and a nut component supported on said screw component for axial movement relative to said first friction clutch in response to rotation of said screw component, and wherein said first worm drive mechanism includes a worm gear fixed to said rotary screw which is meshed with a worm driven by said first electric motor.

7. The drive axle assembly of claim 5 wherein a first drive mode is established when said first friction clutch is engaged and said second friction clutch is released, whereby said first axleshaft is overdriven relative to said input component and said differential causes said second axleshaft to be underdriven relative to said input component.

8. The drive axle assembly of claim 7 wherein a second drive mode is established when said first friction clutch is released and said second friction clutch is engaged, whereby said second axleshaft is overdriven relative to said input component and said differential causes said first axleshaft to be underdriven relative to said input component.

9. A drive axle assembly for use in a motor vehicle having a powertrain and first and second wheels comprising:

an input shaft driven by the powertrain;

a first axleshaft driving the first wheel;

a second axleshaft driving the second wheel;

a differential having an input component driven by said input shaft, a first output component driving said first axleshaft and a second output component driving said second axleshaft;

a first speed changing unit operably disposed between one of said input component and said first output component and said first axleshaft;

a second speed changing unit operably disposed between said second output component and said second axleshaft;

a first friction clutch for selectively engaging said first speed changing unit;

a second friction clutch for selectively engaging said second speed changing unit;

a first clutch actuator including a first operator applying a clutch engagement force to said first friction clutch, a first worm drive mechanism coupled to said first operator and a first electric motor driving said first worm drive mechanism;

a second clutch actuator including a second operator for applying a clutch engagement force to said second friction clutch, a second worm drive mechanism coupled to said second operator and a second electric motor driving said second worm drive mechanism; and a control system for controlling actuation of said first and second electric motors.

10. The drive axle assembly of claim 9 wherein said first operator is a first ball screw unit having a rotary screw component and a nut component supported on said screw component for axial movement relative to said first friction clutch in response to rotation of said screw component, and wherein said first worm drive mechanism includes a worm gear fixed to said rotary screw which is meshed with a worm driven by said first electric motor.

11. The drive axle assembly of claim 9 wherein a first drive mode is established when said first friction clutch is engaged and said second friction clutch is released, whereby said first axleshaft is overdriven relative to said input component and said differential causes said second axleshaft to be underdriven relative to said input component.

12. The drive axle assembly of claim 9 wherein a second drive mode is established when said first friction clutch is released and said second friction clutch is engaged, whereby said second axleshaft is overdriven relative to said input component and said differential causes said first axleshaft to be underdriven relative to said input component.

* * * * *